United States Patent
Baba

(10) Patent No.: US 6,556,640 B1
(45) Date of Patent: Apr. 29, 2003

(54) DIGITAL PLL CIRCUIT AND SIGNAL REGENERATION METHOD

(75) Inventor: Mitsuo Baba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/205,878

(22) Filed: Dec. 4, 1998

(30) Foreign Application Priority Data

Dec. 4, 1997 (JP) .............................. 9-334475

(51) Int. Cl.[7] ................................. H03D 3/24

(52) U.S. Cl. ....................... 375/376; 370/518; 327/150; 327/152; 327/153; 327/159; 327/161

(58) Field of Search ................................ 375/215, 226, 375/360, 371, 373, 375, 376; 327/144, 150, 151, 152, 153, 154, 159, 161; 370/516–518

(56) References Cited

U.S. PATENT DOCUMENTS

| | | | |
|---|---|---|---|
| 5,146,748 A | | 9/1992 | Dragotin ..................... 375/119 |
| 5,887,040 A | * | 3/1999 | Jung et al. .................... 375/372 |
| 5,920,600 A | * | 7/1999 | Yamaoka et al. ........... 375/376 |
| 6,219,393 B1 | * | 4/2001 | Kuwahara ................... 375/354 |
| 6,266,799 B1 | * | 7/2001 | Lee et al. ....................... 716/6 |

FOREIGN PATENT DOCUMENTS

| | | |
|---|---|---|
| EP | 0 400-398 B1 | 2/1995 |
| EP | 0 614-281 B1 | 10/1999 |
| JP | 4-22234 | 1/1992 |
| JP | 4-319829 | 11/1992 |
| JP | 8-237117 | 9/1996 |
| JP | 2773669 | 4/1998 |

OTHER PUBLICATIONS

Proceedings of the 1997 Electronics Society Conference of ICICE C–12–25, C–12–26.
Proceedings of the 1996 Electronics Society Conference of ICICE SC–13–5.
Proceedings of the 1996 Communications Society Conference of ICICE B–844.

* cited by examiner

Primary Examiner—Stephen Chin
Assistant Examiner—Dac V. Ha
(74) Attorney, Agent, or Firm—Scully, Scott, Murphy & Presser

(57) ABSTRACT

An input data signal is digitally sampled by a data sampling section using an N-phase clock signal including N clock signals whose frequencies are almost the same as the bit rate of the input data signal and whose phases has been successively shifted by 1/N of the clock cycle, and thereby a parallel sample data signal including N sample data signals is obtained. An edge point detection operation section detects edge points in the N sample data signals in one cycle of an extracted clock signal and outputs an edge point operation output signal. A clock signal extraction section selects a clock signal from the N-phase clock signal based on the information of the edge point operation output signal and outputs the selected clock signal as the extracted clock signal. A delay section delays the N sample data signals of the parallel sample data signal and thereby outputs a parallel delayed sample data signal including N delayed sample data signals. A data regeneration section selects a delayed sample data signal from the N delayed sample data signals based on the information of the edge point operation output signal and outputs the selected delayed sample data signal as a regenerated data signal. Due to the delay by the delay section, extraction time of the digital PLL circuit can be decreased to 0 without enlarging the overhead in the input data signal.

32 Claims, 17 Drawing Sheets

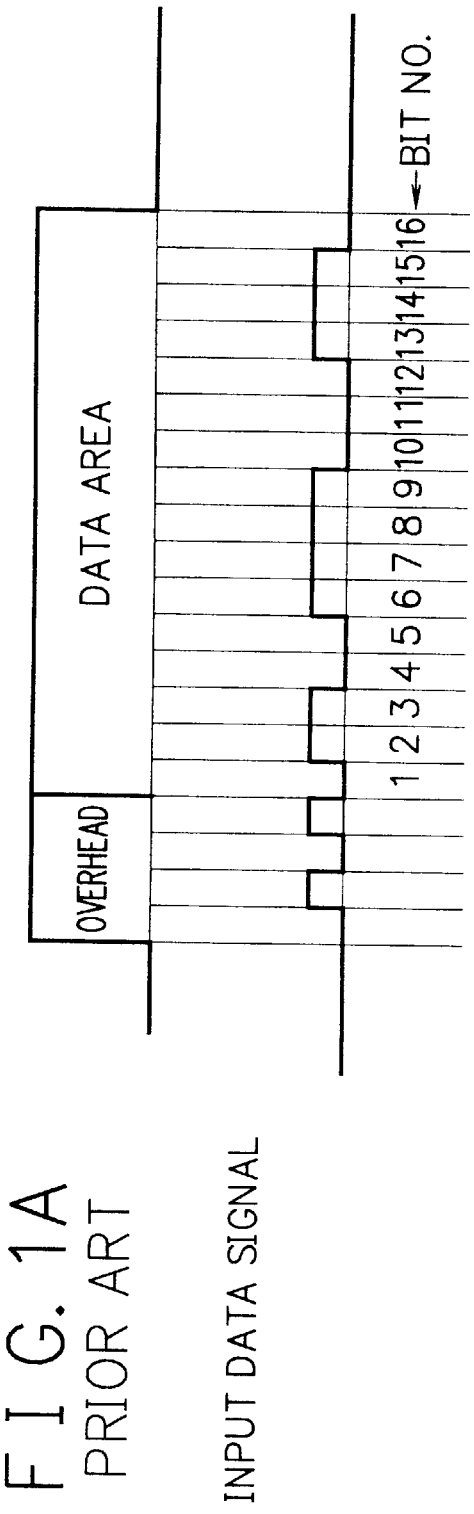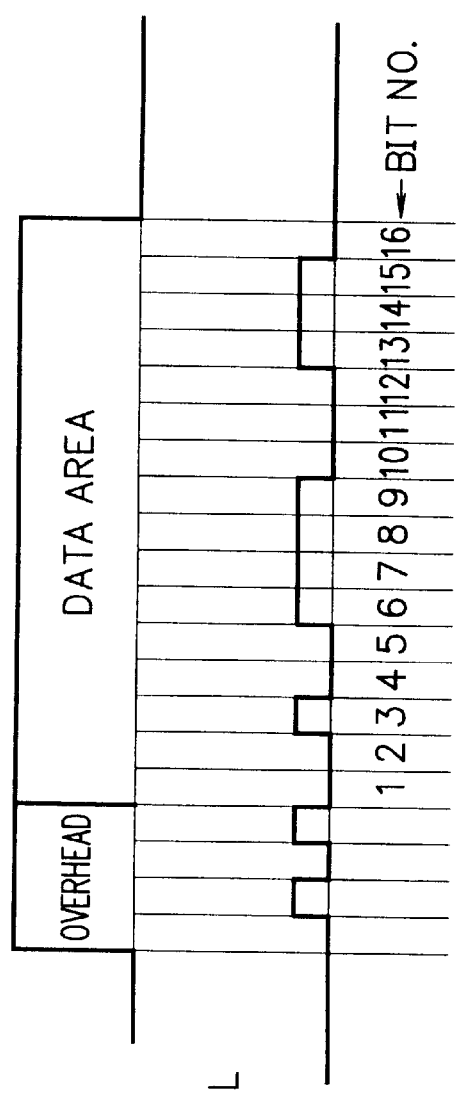

SELECT s (OR t)

SELECT OUTPUT OF ENCODER SECTION 802

SELECT s

SELECT t

DIGITAL PLL CIRCUIT AND SIGNAL REGENERATION METHOD

BACKGROUND OF THE INVENTION

The present invention relates to a digital PLL (Phase Locked Loop) circuit and a signal regeneration method, and in particular, to a digital PLL circuit and a signal regeneration method which are employed in optical communication systems such as PON (Passive Optical Network) including PDS (Passive Double Star) etc.

DESCRIPTION OF THE PRIOR ART

These days, high speed and high volume data transmission is being more and more required due to development and enlargement of telecommunication techniques. In order to meet such requirements, considerable studies have been done on digital PLL circuits for quickly extracting a clock signal from burst input data signal and executing quick signal regeneration from the burst input data signal, and on signal regeneration methods utilizing such digital PLL circuits, as disclosed in Proceedings of the 1997 Electronics Society Conference of ICICE (the Institute of Electronics, Information and Communication Engineers (Japan)), C-12-25, C-12-26, Proceedings of the 1996 Electronics Society Conference of ICICE, SC-13-5, Proceedings of the 1996 Communications Society Conference of ICICE, B-844, etc.

In general, in order to realize such a high speed digital PLL circuit, digital PLL circuits are required "quick extraction", that is, the capability of extracting and outputting an extracted clock signal and a regenerated data signal from burst input data signal at high speed (within a few bits).

Here, the "extraction" means an operation of the digital PLL circuit for extracting a regenerated data signal having no errors from the burst data signal which is inputted to the digital PLL circuit.

And a word "extraction time" is used in the sense that will be described below. FIGS. 1A and 1B are schematic diagrams for explaining the meaning of the word "extraction time". FIG. 1A shows an input data signal which is supplied from a terminal to the digital PLL circuit, and FIG. 1B shows a regenerated data signal which has been regenerated by the digital PLL circuit from the input data signal. Referring to FIG. 1A, the input data signal includes an overhead and a data area. The overhead is provided as the preamble of the data signal and is used as training bits for the digital PLL circuit. In FIG. 1A, each bit in the data area of the input data signal is assigned a bit number, in which the assignment is started at the front end of the data area. In FIG. 1B, each bit in the data area of the regenerated data signal is also assigned a bit number in the same way. Referring to the regenerated data signal of FIG. 1B, part in the data area starting from the third bit could be regenerated by the digital PLL circuit without errors. Therefore, the "extraction time" in the case of FIGS. 1A and 1B is 3 bits. In the following, the important concept "extraction time" will be used in the sense that has been explained above.

In the following, a conventional digital PLL circuit and its signal regeneration method will be explained referring to FIG. 2. FIG. 2 is a schematic block diagram showing a conventional digital PLL circuit which has been proposed by the present inventor.

The digital PLL circuit shown in FIG. 2 comprises a data sampling section 1, a data regeneration section 3, an edge point detection operation section 4, and a clock signal extraction section 5.

The data sampling section 1 is supplied with an input data signal 10 and an N-phase clock signal 11 (N: integer larger than 1) which is composed of N clock signals whose frequencies are almost the same as the bit rate of the input data signal 10 and whose phases has been successively shifted by 1/N of the clock cycle. The data sampling section 1 digitally samples the input data signal 10 using the N-phase clock signal 11, and thereby outputs a parallel sample data signal 6 which is composed of N sample data signals.

The edge point detection operation section 4 is supplied with the parallel sample data signal 6 outputted by the data sampling section 1 and an extracted clock signal 12 which is outputted by the clock signal extraction section 5. The edge point detection operation section 4 acquires the N sample data signals of the parallel sample data signal 6 with timing in sync with the extracted clock signal 12, obtains a clock phase number which indicates the position of a rising edge in the input data signal 10 in one cycle of the extracted clock signal 12 and a clock phase number which indicates the position of a falling edge in the input data signal 10 in one cycle of the extracted clock signal 12, calculates the average of the clock phase numbers concerning the rising edges in a predetermined period till the moment and the average of the clock phase numbers concerning the falling edges in a predetermined period till the moment, obtains the number of rising edges and the number of falling edges of the input data signal 10 in one cycle of the extracted clock signal 12, and outputs an edge point operation output signal 8 which includes information on the average clock phase number concerning the rising edges, information on the average clock phase number concerning the falling edges, and information on the number of rising edges and the number of falling edges of the input data signal 10 in one cycle of the extracted clock signal 12.

The clock signal extraction section 5 is supplied with the N-phase clock signal 11 and the edge point operation output signal 8 outputted by the edge point detection operation section 4. The clock signal extraction section 5 selects a clock signal from the N clock signals composing the N-phase clock signal 11 based on the information of the edge point operation output signal 8, and outputs the selected clock signal as the extracted clock signal 12.

The data regeneration section 3 is supplied with the parallel sample data signal 6 outputted by the data sampling section 1, the edge point operation output signal 8 outputted by the edge point detection operation section 4, and the extracted clock signal 12 outputted by the clock signal extraction section 5. The data regeneration section 3 selects one sample data signal from the N sample data signals of the parallel sample data signal 6 based on the information of the edge point operation output signal 8, and outputs the selected sample data signal as a regenerated data signal 13 in sync with the extracted clock signal 12.

In the digital PLL circuit shown in FIG. 2 and its signal regeneration method, the parallel sample data signal 6 including the N sample data signals is obtained by the data sampling section 1, by digitally sampling the input data signal 10 using the N-phase clock signal 11 which is composed of N clock signals whose frequencies are almost the same as the bit rate of the input data signal 10 and whose phases has been successively shifted by 1/N of the clock cycle. Edge points of the input data signal 10 in one cycle of the extracted clock signal 12 are detected by referring to the N sample data signals of the parallel sample data signal 6 and the edge point operation output signal 8 including the information on the edge points are generated, by the edge point detection operation section 4, The extracted clock signal 12 is selected by the clock signal extraction section 5 from the N clock signals of the N-phase clock signal 11 based on the information of the edge point operation output signal 8. And one sample data signal is selected by the clock signal extraction section 5 from the N sample data signals of the parallel sample data signal 6 based on the information of the edge point operation output signal 8 and the selected sample data signal is outputted as a regenerated data signal 13 in sync with the extracted clock signal 12.

Such digital PLL circuits and signal regeneration methods are generally utilized for realizing bi-directional optical communication via optical fiber in optical communication systems such as PDS (Passive Double Star) in which terminals and base stations are connected in the shape of stars by star couplers etc.

The data signal transmitted between the base stations and the terminal by means of optical communication has the construction which has been shown in FIGS. 1A and 1B, for example. Generally, the base station transmits a data signal that includes an overhead and a data area in a burst frame, and the terminal transmits a data signal that includes an overhead that is in sync with the clock of the base station.

Such a data signal transmitted from the terminal or the base stations generally involves fluctuation such as duty distortion, jitter, frequency deviation, etc., depending on the optical path length, circuit composition, etc. Therefore, digital PLL circuits and signal regeneration methods are required resistance to such fluctuation or deterioration of the quality of the data signal.

The overhead in the data signal shown in FIGS. 1A and 1B is utilized by digital PLL circuits as training bits, as mentioned before. Therefore, signal regeneration by the digital PLL circuit can be performed more correctly if the number of bits of the overhead can be made larger. However, if long overhead is employed, the data area in one burst frame is necessitated to be small. Therefore, the digital PLL circuits and the signal regeneration methods are being required to realize the quick extraction, along with minimizing the length of the overhead and utilizing the data area efficiently.

Here, an example of the conventional digital PLL circuit which has been shown in FIG. 2 will be described more concretely. FIG.3 is a block diagram showing composition of a digital PLL circuit which has been proposed by the present inventor in Japanese Patent Application Laid-Open No. HEI8-237117. The conventional digital PLL circuit shown in FIG.3 has been designed in order to realize the quick extraction of the regenerated data signal having no errors from the burst input data which involves phase fluctuation such as duty distortion, jitter, frequency deviation, etc.

Referring to FIG. 3, the conventional digital PLL circuit comprises an input terminal 100 for receiving an input data signal 10, a data sampling circuit 123, an edge detection circuit 124, a falling edge counter 125, a clock selector 127, and a data recognition retiming circuit 128.

The data sampling circuit 123 executes digital sampling of the input data signal 10 using an N-phase clock signal 11 which is composed of N clock signals whose phases have been successively shifted by 1/N of the clock cycle and thereby obtains N sample data signals D0~DN. The edge detection circuit 124 detects varying points (referred to as "edges" or "edge points") in the input data signal 10 by referring to the sample data signals D0~DN which have been obtained by the data sampling circuit 123, and thereby outputs information 107, 109 and 110 concerning the edges. The information 107, 109 and 110 are information concerning the positions of the edge points, information concerning the number of rising edges, and information concerning the number of falling edges, which will be described below. The falling edge counter 125 calculates the average 104 of positions of falling edges which have been detected by the edge detection circuit 124 in a predetermined period. The clock selector 127 selects one clock signal from the N clock signals of the N-phase clock signal 11 and outputs the selected clock signal as an extracted clock signal 12. The data recognition retiming circuit 128 outputs a regenerated data signal 13 which is in sync with the extracted clock signal 12.

The digital PLL circuit detects edges (i.e. varying points) in the input data signal 10 in each cycle of the extracted clock signal 12 by digitally sampling the input data signal 10 using the N-phase clock signal 11 (composed of N clock signals whose phases have been successively shifted by 1/N of the clock cycle) and thereby obtaining the N sample data signals D0~DN. The extracted clock signal 12 is selected from the N clock signals of the N-phase clock signal 11 based on the result of the detection of edges in each cycle of the extracted clock signal 12. The regenerated data signal 13 is obtained by executing selection from the N sample data signals D0~DN based on the result of the detection of edges.

In the following, the operation of the digital PLL circuit of FIG. 3 will be described referring to FIG. 3 and FIG. 4.

FIG. 4 is a schematic diagram which conceptually explains the operation of the digital PLL circuit of FIG. 3. FIG. 4 shows a case where the number of phases of the N-phase clock signal 11 is 8 (i.e. N=8). Incidentally, the edge detection operation shown in FIG. 4 will also be employed in a digital PLL circuit according to the present invention.

In the case where the input data signal 10 at a moment is sampled by the data sampling circuit 123 using the 8-phase clock signal including 8 clock signals whose phases have been shifted by 1/8 of the clock cycle, the sample data D0~DN which is obtained by the data sampling circuit 123 becomes a sequence of 0/1 data as shown in (A) in FIG. 4.

In the sequence of 0/1 data, a point where the sample data varies from 0 to 1 will be referred to as a rising edge point, and a point where the sample data varies from 1 to 0 will be referred to as a falling edge point.

The rising edge point and the falling edge point have to be assigned discrete numbers (integers) in order to handle the edge points digitally. Therefore, with regard to a rising edge point where the sample data varied from 0 to 1, the phase number (1, 2, 3, 4, 5, 6, 7 or 8) of a clock signal (included in the 8-phase clock signal) with which the sample data varied to 1 ("2" in (A) of FIG. 4) is assigned to the rising edge point. On the other hand, with regard to a falling edge point where the sample data varied from 1 to 0, the phase number of a clock signal (included in the 8-phase clock signal) with which the sample data varied to 0 ("7" in (A) of FIG. 4) is assigned to the falling edge point.

The edge detection circuit 124 executes detection of edge points according to the method described above. The edge detection circuit 124 also obtains the number of rising edge points in one cycle of the extracted clock signal 12 and the number of falling edge points in one cycle of the extracted clock signal 12. The edge detection circuit 124 outputs the clock phase number information 107 concerning the edge points to the falling edge counter 125, and outputs the information 109 on the number of rising edge points in a cycle of the extracted clock signal 12 and the information 110 on the number of falling edge points in a cycle of the extracted clock signal 12 to the data recognition retiming circuit 128.

The falling edge counter 125, which received the clock phase number information 107, obtains the average of the clock phase numbers of falling edge points in a predetermined period till the moment.

Here, if the input data signal 10 has no phase fluctuation such as duty distortion, jitter, etc., there is no need to take the average by the falling edge counter 125. However, as a matter of fact, the input data signal 10 generally involves phase fluctuation due to jitter, duty distortion, etc., and thus the clock phase number of the rising edge point and the clock phase number of the falling edge point vary with time. Therefore, the falling edge counter 125 takes the average of the clock phase numbers of falling edge points in a predetermined period till the moment. As shown in FIG. 4, such an average is not an integer, and thus the average is rounded off to the nearest integer. Incidentally, the average of phase numbers is taken by the falling edge counter 125 between falling edges, and thus the average phase number is updated when a new falling edge is detected in the sample data signals D0~DN.

The averaging by the falling edge counter 125 is executed in order to obtain the phase of the center point of jitter (fluctuation with time) of the falling edges in the input data signal 10. Therefore, when the phase of the center point of the jitter varied at a low speed, the average taken by the falling edge counter 125 varies following the variation.

The averaging by the falling edge counter 125 has a meaning of suppressing the jitter of the edge points in the input data signal 10. In the operation of the digital PLL circuit, by the averaging, high frequency components of the jitter is suppressed (ignored) and low frequency components of the jitter is not ignored, and thus the digital PLL circuit follows the low speed variation of the edge points.

The falling edge counter 125 outputs the average 104, that is, information on the average phase number (average position) of the falling edges to the clock selector 127.

The clock selector 127 selects a clock signal that corresponds to the average 104 from the N clock signals in the N-phase clock signal 11, and outputs the selected clock signal to the data sampling circuit 123, the data recognition retiming circuit 128 and outside, as the extracted clock signal 12.

The extracted clock signal 12 selected by the clock selector 127 is used by the data recognition retiming circuit 128 for the selection of the regenerated data signal 13 from the N sample data signals D0~DN.

The data recognition retiming circuit 128 is supplied with the information 109 on the number of rising edge points and the information 110 on the number of falling edge points which are outputted by the edge detection circuit 124, the N sample data signals D0~DN which are outputted by the data sampling circuit 123, and the extracted clock signal 12 which is outputted by the clock selector 127.

In the following, the data regeneration operation of the data recognition retiming circuit 128 will be described referring to FIG. 5. FIG. 5 is a schematic diagram which conceptually explains the data regeneration operation of the data recognition retiming circuit 128. Incidentally, the concept of the data regeneration operation shown in FIG. 5 will also be employed in the digital PLL circuit according to the present invention.

As shown in FIG. 5, the data regeneration operation of the data recognition retiming circuit 128 is controlled depending on the number of edge points in one cycle T of the extracted clock signal 12. The data recognition retiming circuit 128 is supplied with the information 109 on the number of rising edge points in a cycle T of the extracted clock signal 12 and the information 110 on the number of falling edge points in a cycle T of the extracted clock signal 12 from the edge detection circuit 124 as shown in FIG. 3, and the data recognition retiming circuit 128 determines the value of the regenerated data signal 13 utilizing the information 109 and 110.

For example, in the case where the number of edge points in a cycle T of the extracted clock signal 12 is 0, the input data signal 10 should have had a constant value 0 or 1 during the cycle T (pattern (A) in FIG. 5). Therefore, any one of the N sample data signals D0~DN during the cycle T of the extracted clock signal 12 can be selected as the regenerated data signal 13.

In the case where the number of edge points in a cycle T of the extracted clock signal 12 is 2, the input data signal 10 should have had one convex pulse (rising edge+falling edge) or one concave pulse (falling edge+rising edge) during the cycle T (pattern (B) in FIG. 5). Therefore, one of the N sample data signals D0~DN just after the first edge point in the cycle T is selected as the regenerated data signal 13. Concretely, in the case where the first edge point in the cycle T is a rising edge point as shown in "b1" of FIG. 5, data during the cycle T is judged to be 1. On the other hand, in the case where the first edge point in the cycle T is a falling edge point as shown in "b2" of FIG. 5, data during the cycle T is judged to be 1.

In the case where the number of edge points in a cycle T of the extracted clock signal 12 is 1, the input data signal 10 should have had changed its value from 1 to 0 or from 0 to 1 during the cycle T (pattern (C) in FIG. 5). In the case where the edge point in the cycle T is a falling edge point, the data recognition retiming circuit 128 judges that data during the cycle T is 0 if the position of the falling edge point is on the left side of the center of the cycle T, and judges that data during the cycle T is 1 if the position of the falling edge point is on the right side of the center of the cycle T. On the other hand, in the case where the edge point in the cycle T is a rising edge point, the data recognition retiming circuit 128 judges that data during the cycle T is 1 if the position of the rising edge point is on the left side of the center of the cycle T, and judges that data during the cycle T is 0 if the position of the rising edge point is on the right side of the center of the cycle T.

The data recognition retiming circuit 128 outputs the regenerated data signal 13 which is in sync with the extracted clock signal 12, according to the data regeneration operation described above.

As described above, in the digital PLL circuit and the signal regeneration method which have been proposed by the present inventor in Japanese Patent Application Laid-Open No. HEI8-237117, even if the phase of the input data signal 10 fluctuated due to jitter etc., the input data signal 10 is digitally sampled using the N-phase clock signal 11 and the average phase number of edge points of the input data signal 10 is obtained by referring to the N sample data signals D0~DN. The extracted clock signal 12 is selected from the N clock signals of the N-phase clock signal 11 based on the average phase number of edge points. The data recognition is executed by selecting one sample data signal from the N sample data signals D0~DN as the regenerated data signal 13 based on the information 109 and 110 concerning the number of edge points in one cycle of the extracted clock signal 12. The regenerated data signal 13 as the result of the data recognition is outputted with timing in sync with the extracted clock signal 12.

Therefore, according to the digital PLL circuit and the signal regeneration method, for the input of the burst input data signal 10 which involves phase fluctuation due to frequency deviation, duty distortion, jitter, etc, a clock signal in the N-phase clock signal 11 that is in sync with the input data signal 10 can be extracted as the extracted clock signal 12, and data to which data recognition and re-timing has been executed with no errors can be obtained as the regenerated data signal 13, with quick extraction, that is, in a short time within a few bits.

However, the speed of the extraction by the digital PLL circuit and the signal regeneration method which have been described above is not enough, and a digital PLL circuit and a signal regeneration method, which can realize quicker extraction along with maximum usage efficiency of the data area of the data signal and enough resistance to jitter and duty distortion of the input data signal at a low cost, are now being required.

However, in the conventional digital PLL circuit and the signal regeneration method described above, the "quick extraction" is incompatible with the "efficient use of the data area", and the "quick extraction" is incompatible with the "resistance to jitter and duty distortion of the input data signal", and thus it has been impossible to provide such a digital PLL circuit and a signal regeneration method which can realize quicker extraction, maximum usage efficiency of the data area, and enough resistance to jitter and duty distortion of the input data signal.

In the following, the relationship between the "quick extraction" and the "efficient use of the data area", and the relationship between the "quick extraction" and the "resistance to jitter and duty distortion" in the conventional digital PLL circuit and signal regeneration method will be explained.

First, the relationship between the "quick extraction" and the "efficient use of the data area" will be described. In the conventional digital PLL circuit and signal regeneration method described above, in order to shorten the extraction time (decrease the number of error bits in the data area of the regenerated data signal), one solution is to increase the number of bits of the overhead (shown in FIGS. 1A and 1B) which is utilized for clock recovery etc. By increasing the number of bits of the overhead, the number of bits (in the data area of the regenerated data signal) which can include errors becomes small, and thus the "quick extraction" can be realized. However, part of the data signal that can be utilized as the data area is necessitated to be small due to the increasing of the number of bits of the overhead. Therefore, the "quick extraction" and the "efficient use of the data area" are antinomy and incompatible with each other.

Next, the relationship between the "quick extraction" and the "resistance to jitter and duty distortion" will be described. In the conventional digital PLL circuit and signal regeneration method described above, in order to improve resistance to jitter or resistance to duty distortion, the amount of phase correction with respect to phase fluctuation in the input data signal should be made small, and feedback control should be executed with small feedback gain. However, in such a feedback circuit having relatively small feedback gain in comparison with the phase fluctuation in the input data signal, phase correction per one phase comparison becomes small, and thus the extraction time is necessitated to be long.

On the other hand, in order to shorten the extraction time, feedback control against the phase fluctuation in the input data signal should be executed with large feedback gain. However, in such a feedback circuit having relatively large feedback gain in comparison with the phase fluctuation in the input data signal, the extracted phase information follows wildly to the jitter and the duty distortion, or might start oscillating, and thereby data recognition errors are caused. Therefore, the resistance to jitter and the resistance to duty distortion are necessitated to be decreased.

Therefore, the "quick extraction" and the "resistance to jitter and duty distortion" are antinomy and incompatible with each other in the conventional digital PLL circuit and signal regeneration method, and thus an attempt to shorten the extraction time lowers the resistance to jitter and duty distortion, and errors occur in the regenerated data signal.

SUMMARY OF THE INVENTION

It is therefore the primary object of the present invention to provide a digital PLL circuit and a signal regeneration method which can realize the quicker extraction along with the efficient use of the data area and the resistance to jitter and duty distortion of the input data signal.

In accordance with a first aspect of the present invention, there is provided a digital PLL circuit comprising a data sampling means, an edge point detection operation means, a clock signal extraction means, a delay means, and a data regeneration means. The data sampling means is supplied with an input data signal and an N-phase clock signal (N: integer larger than 1) including N clock signals whose frequencies are almost the same as the bit rate of the input data signal and whose phases has been successively shifted by 1/N of the clock cycle. The data sampling means digitally samples the input data signal using the N clock signals and thereby outputs a parallel sample data signal including N sample data signals. The edge point detection operation means acquires the N sample data signals of the parallel sample data signal, detects edge points in the acquired N sample data signals in one cycle of an extracted clock signal, and outputs an edge point operation output signal which includes information on the edge points in one cycle of the extracted clock signal. The clock signal extraction means is supplied with the N-phase clock signal and the edge point operation output signal outputted by the edge point detection operation means. The clock signal extraction means selects a clock signal from the N clock signals of the N-phase clock signal based on the information of the edge point operation output signal and outputs the selected clock signal as the extracted clock signal. The delay means delays the N sample data signals of the parallel sample data signal supplied from the data sampling means and thereby outputs a parallel delayed sample data signal including N delayed sample data signals. The data regeneration means is supplied with the parallel delayed sample data signal outputted by the delay means and the edge point operation output signal outputted by the edge point detection operation means. The data regeneration means selects a delayed sample data signal from the N delayed sample data signals of the parallel delayed sample data signal based on the information of the edge point operation output signal and outputs the selected delayed sample data signal as a regenerated data signal.

In accordance with a second aspect of the present invention, in the first aspect, the extracted clock signal extracted by the clock signal extraction means is outputted to the outside of the digital PLL circuit.

In accordance with a third aspect of the present invention, in the first aspect, the delay time of the delay means is set so that time necessary for obtaining the extracted clock signal based on a parallel sample data signal will not become longer than time necessary for obtaining the regenerated data signal from the parallel sample data signal.

In accordance with a fourth aspect of the present invention, in the first aspect, the delay means delays the N sample data signals of the parallel sample data signal keeping phase differences between the N sample data signals.

In accordance with a fifth aspect of the present invention, in the first aspect, the delay means includes N flip-flop lines each of which including M stages of flip-flops (M: natural number). Each flip-flop line is supplied with corresponding one of the N clock signals of the N-phase clock signal to clock terminals of its M flip-flops and delays corresponding one of the N sample data signals of the parallel sample data signal by M bits.

In accordance with a sixth aspect of the present invention, in the first aspect, the delay means includes a 1/L frequency demultiplier for demultiplying the frequencies of the N clock signals of the N-phase clock signal by L (L: integer larger than 1) and N flip-flop lines each of which including M stages of flip-flops (M: natural number). Each flip-flop line is supplied with corresponding one of the N clock signals of the N-phase clock signal whose frequency has been demultiplied by the 1/L frequency demultiplier to clock terminals of its M flip-flops and delays corresponding one of the N sample data signals of the parallel sample data signal by M×L bits.

In accordance with a seventh aspect of the present invention, in the first aspect, the edge point operation output signal outputted by the edge point detection operation means includes information on the phase number of a clock signal in the N clock signals of the N-phase clock signal that indicates a rising edge of the input data signal.

In accordance with an eighth aspect of the present invention, in the first aspect, the edge point operation output signal outputted by the edge point detection operation means includes information on the phase number of a clock signal in the N clock signals of the N-phase clock signal that indicates a falling edge of the input data signal.

In accordance with a ninth aspect of the present invention, in the seventh aspect, the edge point operation output signal outputted by the edge point detection operation means includes information on the number of edge points of the input data signal in one cycle of the extracted clock signal.

In accordance with a tenth aspect of the present invention, in the eighth aspect, the edge point operation output signal outputted by the edge point detection operation means includes information on the number of edge points of the input data signal in one cycle of the extracted clock signal.

In accordance with an eleventh aspect of the present invention, in the seventh aspect, the edge point operation output signal outputted by the edge point detection operation means includes information on the average of the phase numbers that indicate the rising edges of the input data signal in a predetermined period.

In accordance with a twelfth aspect of the present invention, in the eighth aspect, the edge point operation output signal outputted by the edge point detection operation means includes information on the average of the phase numbers that indicate the falling edges of the input data signal in a predetermined period.

In accordance with a thirteenth aspect of the present invention, in the first aspect, the edge point detection operation means acquires the N sample data signals of the parallel sample data signal with timing in sync with the extracted clock signal.

In accordance with a fourteenth aspect of the present invention, in the eleventh aspect, the clock signal extraction means utilizes the information on the average of the phase numbers that indicate the rising edges of the input data signal for the selection of the extracted clock signal.

In accordance with a fifteenth aspect of the present invention, in the twelfth aspect, the clock signal extraction means utilizes the information on the average of the phase numbers that indicate the falling edges of the input data signal for the selection of the extracted clock signal.

In accordance with a sixteenth aspect of the present invention, in the first aspect, the data regeneration means is supplied with the extracted clock signal outputted by the clock signal extraction means, and outputs the regenerated data signal with timing in sync with the extracted clock signal.

In accordance with a seventeenth aspect of the present invention, there is provided a digital PLL circuit which digitally samples an input data signal using an N-phase clock signal (N: integer larger than 1) including N clock signals whose frequencies are almost the same as the bit rate of the input data signal and whose phases has been successively shifted by 1/N of the clock cycle and thereby obtains a parallel sample data signal including N sample data signals, detects edge points of the input data signal in one cycle of an extracted clock signal by referring to the N sample data signals of the parallel sample data signal, obtains the extracted clock signal by selecting one clock signal from the N clock signals of the N-phase clock signal based on the result of the detection of the edge points, obtains a regenerated data signal by executing selection from signals corresponding to the N sample data signals of the parallel sample data signal based on the result of the detection of the edge points, and outputs the regenerated data signal. In the digital PLL circuit, the N sample data signals of the parallel sample data signal are delayed by a delay means and thereby a parallel delayed sample data signal including N delayed sample data signals is obtained, and the selection for obtaining the regenerated data signal is executed from the N delayed sample data signals of the parallel delayed sample data signal.

In accordance with an eighteenth aspect of the present invention, in the seventeenth aspect, the extracted clock signal is outputted to the outside of the digital PLL circuit.

In accordance with a nineteenth aspect of the present invention, in the seventeenth aspect, the delay time of the delay means is set so that time necessary for obtaining the extracted clock signal based on a parallel sample data signal will not become longer than time necessary for obtaining the regenerated data signal from the parallel sample data signal.

In accordance with a twentieth aspect of the present invention, in the seventeenth aspect, the delay means delays the N sample data signals of the parallel sample data signal keeping phase differences between the N sample data signals.

In accordance with a twenty-first aspect of the present invention, in the seventeenth aspect, the delay means includes N flip-flop lines each of which including M stages of flip-flops (M: natural number). Each flip-flop line is supplied with corresponding one of the N clock signals of the N-phase clock signal to clock terminals of its M flip-flops and delays corresponding one of the N sample data signals of the parallel sample data signal by M bits.

In accordance with a twenty-second aspect of the present invention, in the seventeenth aspect, the delay means includes a 1/L frequency demultiplier for demultiplying the frequencies of the N clock signals of the N-phase clock signal by L (L: integer larger than 1) and N flip-flop lines each of which including M stages of flip-flops (M: natural number). Each flip-flop line is supplied with corresponding one of the N clock signals of the N-phase clock signal whose frequency has been demultiplied by the 1/L frequency demultiplier to clock terminals of its M flip-flops and delays corresponding one of the N sample data signals of the parallel sample data signal by M×L bits.

In accordance with a twenty-third aspect of the present invention, in the seventeenth aspect, the result of the detection of the edge points includes information on the phase number of a clock signal in the N clock signals of the N-phase clock signal that indicates a rising edge of the input data signal.

In accordance with a twenty-fourth aspect of the present invention, in the seventeenth aspect, the result of the detection of the edge points includes information on the phase number of a clock signal in the N clock signals of the N-phase clock signal that indicates a falling edge of the input data signal.

In accordance with a twenty-fifth aspect of the present invention, in the twenty-third aspect, the result of the detection of the edge points includes information on the number of edge points of the input data signal in one cycle of the extracted clock signal.

In accordance with a twenty-sixth aspect of the present invention, in the twenty-fourth aspect, the result of the detection of the edge points includes information on the number of edge points of the input data signal in one cycle of the extracted clock signal.

In accordance with a twenty-seventh aspect of the present invention, in the twenty-third aspect, the result of the detection of the edge points includes information on the average of the phase numbers that indicate the rising edges of the input data signal in a predetermined period.

In accordance with a twenty-eighth aspect of the present invention, in the twenty-fourth aspect, the result of the detection of the edge points includes information on the average of the phase numbers that indicate the falling edges of the input data signal in a predetermined period.

In accordance with a twenty-ninth aspect of the present invention, in the seventeenth aspect, the regenerated data signal is outputted with timing in sync with the extracted clock signal.

In accordance with a thirtieth aspect of the present invention, there is provided a signal regeneration method comprising the steps of: a data sampling step, an edge point detection operation step, a clock signal extraction step, a delay step, and a data regeneration step. In the data sampling step, an input data signal is digitally sampled using an N-phase clock signal (N: integer larger than 1) including N clock signals whose frequencies are almost the same as the bit rate of the input data signal and whose phases has been successively shifted by 1/N of the clock cycle, and thereby a parallel sample data signal including N sample data signals is obtained. In the edge point detection operation step, the N sample data signals of the parallel sample data signal are acquired, edge points in the acquired N sample data signals in one cycle of an extracted clock signal are detected, and an edge point operation output signal which includes information on the edge points in one cycle of the extracted clock signal is generated. In the clock signal extraction step, the extracted clock signal is selected from the N clock signals of the N-phase clock signal based on the information of the edge point operation output signal. In the delay step, the N sample data signals of the parallel sample data signal are delayed and thereby a parallel delayed sample data signal including N delayed sample data signals are obtained. And in the data regeneration step, a delayed sample data signal is selected from the N delayed sample data signals of the parallel delayed sample data signal based on the information of the edge point operation output signal and the selected delayed sample data signal is outputted as a regenerated data signal.

In accordance with a thirty-first aspect of the present invention, in the thirtieth aspect, the extracted clock signal is outputted to the outside of the device that employs the signal regeneration method.

In accordance with a thirty-second aspect of the present invention, in the thirtieth aspect, the delay time of the delay step is set so that time necessary for obtaining the extracted clock signal based on a parallel sample data signal will not become longer than time necessary for obtaining the regenerated data signal from the parallel sample data signal.

In accordance with a thirty-third aspect of the present invention, in the delay step of the thirtieth aspect, the N sample data signals of the parallel sample data signal are delayed keeping phase differences between the N sample data signals.

In accordance with a thirty-fourth aspect of the present invention, in the thirtieth aspect, the delay step is executed by a delay means which includes N flip-flop lines each of which including M stages of flip-flops (M: natural number), in which each flip-flop line is supplied with corresponding one of the N clock signals of the N-phase clock signal to clock terminals of its M flip-flops and delays corresponding one of the N sample data signals of the parallel sample data signal by M bits.

In accordance with a thirty-fifth aspect of the present invention, in the thirtieth aspect, the delay step is executed by a delay means which includes a 1/L frequency demultiplier for demultiplying the frequencies of the N clock signals of the N-phase clock signal by L (L: integer larger than 1) and N flip-flop lines each of which including M stages of flip-flops (M: natural number), in which each flip-flop line is supplied with corresponding one of the N clock signals of the N-phase clock signal whose frequency has been demultiplied by the 1/L frequency demultiplier to clock terminals of its M flip-flops and delays corresponding one of the N sample data signals of the parallel sample data signal by M×L bits.

In accordance with a thirty-sixth aspect of the present invention, in the thirtieth aspect, the edge point operation output signal generated in the edge point detection operation step includes information on the phase number of a clock signal in the N clock signals of the N-phase clock signal that indicates a rising edge of the input data signal.

In accordance with a thirty-seventh aspect of the present invention, in the thirtieth aspect, the edge point operation output signal generated in the edge point detection operation step includes information on the phase number of a clock signal in the N clock signals of the N-phase clock signal that indicates a falling edge of the input data signal.

In accordance with a thirty-eighth aspect of the present invention, in the thirty-sixth aspect, the edge point operation output signal generated in the edge point detection operation step includes information on the number of edge points of the input data signal in one cycle of the extracted clock signal.

In accordance with a thirty-ninth aspect of the present invention, in the thirty-seventh aspect, the edge point operation output signal generated in the edge point detection operation step includes information on the number of edge points of the input data signal in one cycle of the extracted clock signal.

In accordance with a fortieth aspect of the present invention, in the thirty-sixth aspect, the edge point operation output signal generated in the edge point detection operation step includes information on the average of the phase numbers that indicate the rising edges of the input data signal in a predetermined period.

In accordance with a forty-first aspect of the present invention, in the thirty-seventh aspect, the edge point operation output signal generated in the edge point detection operation step includes information on the average of the phase numbers that indicate the falling edges of the input data signal in a predetermined period.

In accordance with a forty-second aspect of the present invention, in the edge point detection operation step of the thirtieth aspect, the N sample data signals of the parallel sample data signal are acquired with timing in sync with the extracted clock signal.

In accordance with a forty-third aspect of the present invention, in the fortieth aspect, the information on the average of the phase numbers that indicate the rising edges of the input data signal is utilized for the selection of the extracted clock signal in the clock signal extraction step.

In accordance with a forty-fourth aspect of the present invention, in the forty-first aspect, the information on the average of the phase numbers that indicate the falling edges of the input data signal is utilized for the selection of the extracted clock signal in the clock signal extraction step.

In accordance with a forty-fifth aspect of the present invention, in the data regeneration step of the thirtieth aspect, the regenerated data signal is outputted with timing in sync with the extracted clock signal.

BRIEF DESCRIPTION OF THE DRAWINGS

The objects and features of the present invention will become more apparent from the consideration of the following detailed description taken in conjunction with the accompanying drawings, in which:

FIGS. 1A and 1B are schematic diagrams for explaining the meaning of a word "extraction time";

DESCRIPTION OF THE PREFERRED EMBODIMENTS

Figure 2:
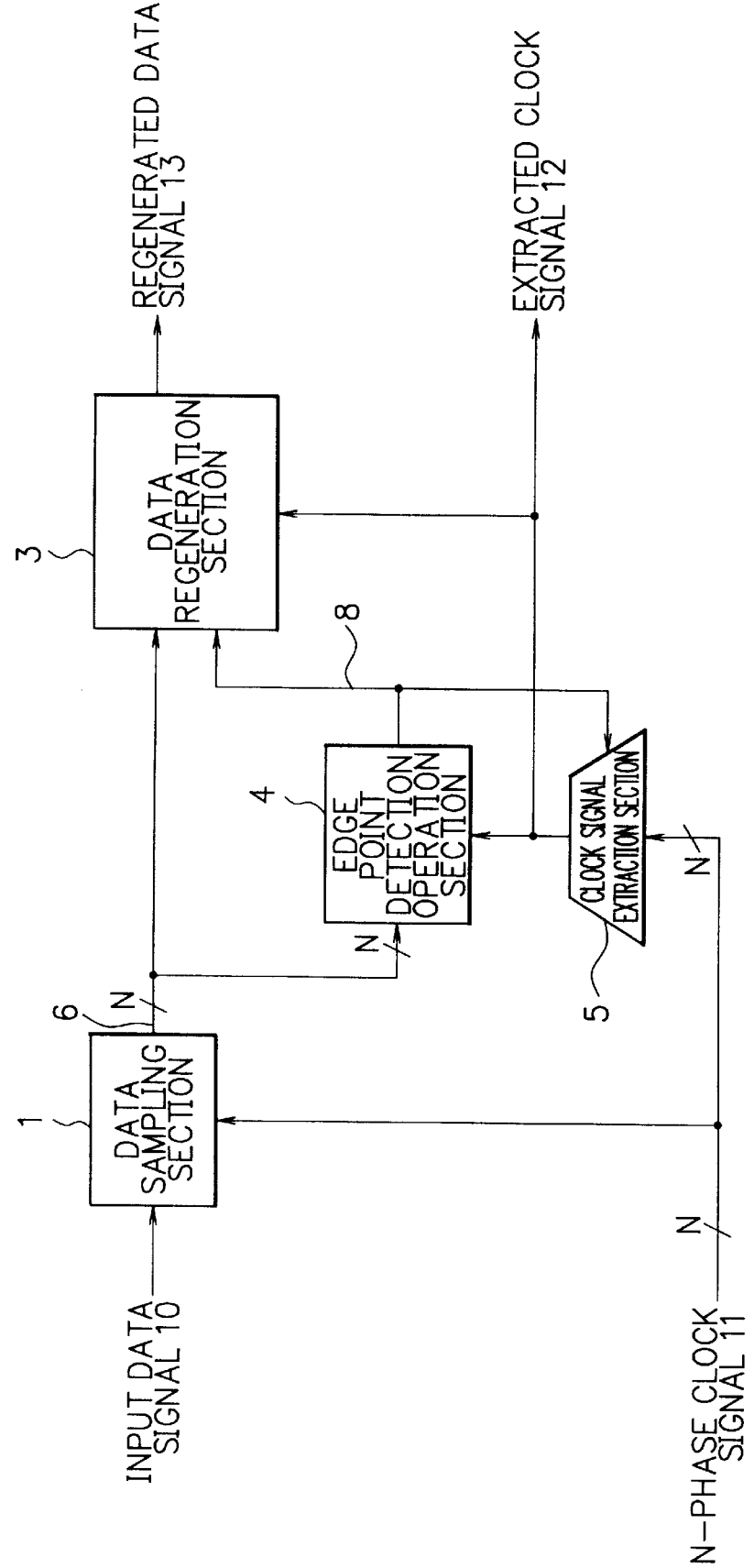
FIG. 2 is a schematic block diagram showing a conventional digital PLL circuit which has been proposed by the present inventor.
Figure 3:
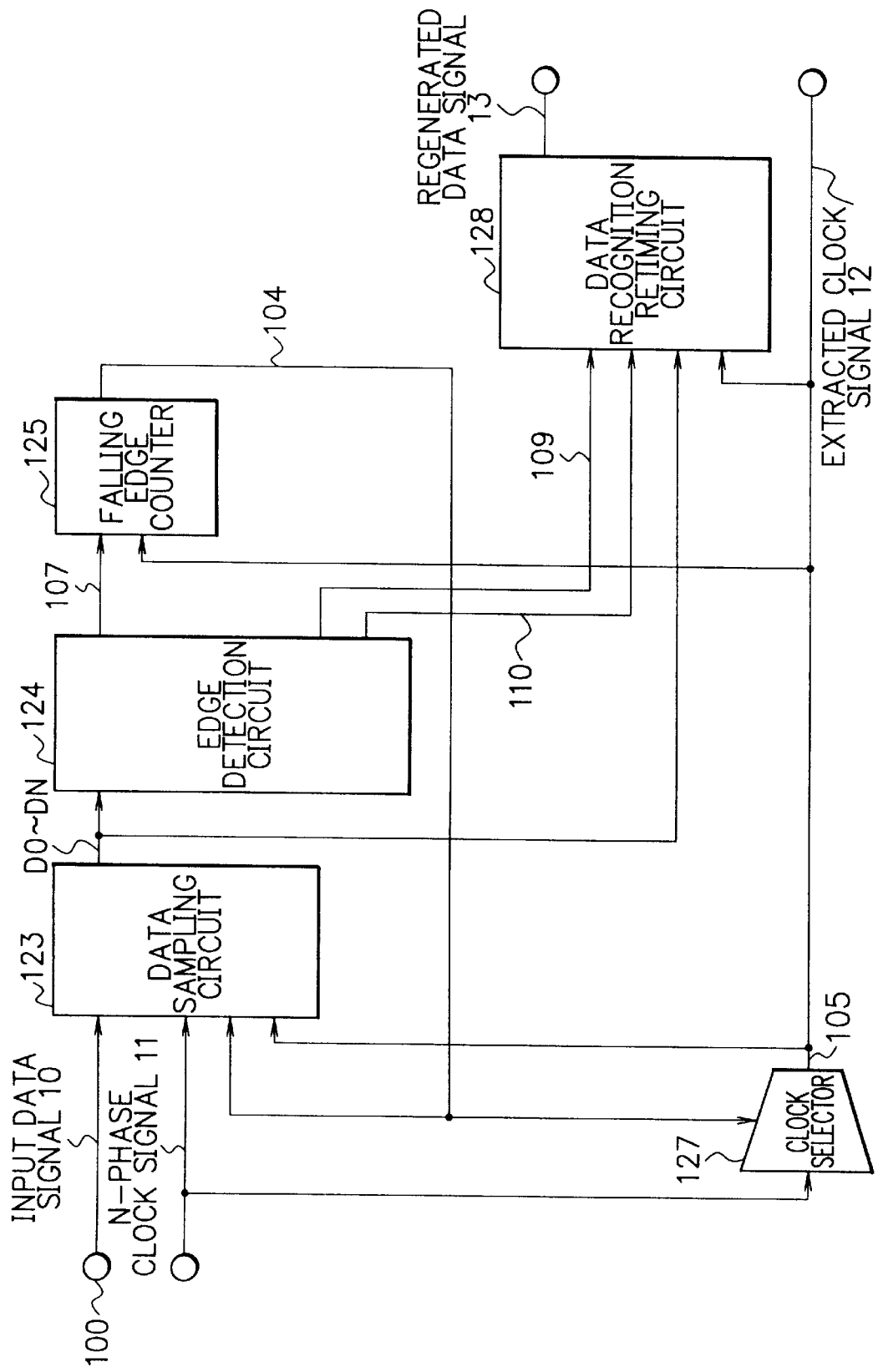
FIG. 3 is a block diagram showing composition of a digital PLL circuit which has been proposed by the present inventor in Japanese Patent Application Laid-Open No. HEI8-237117.

Referring now to the drawings, a description will be given in detail of preferred embodiments in accordance with the present invention.

Figure 6:
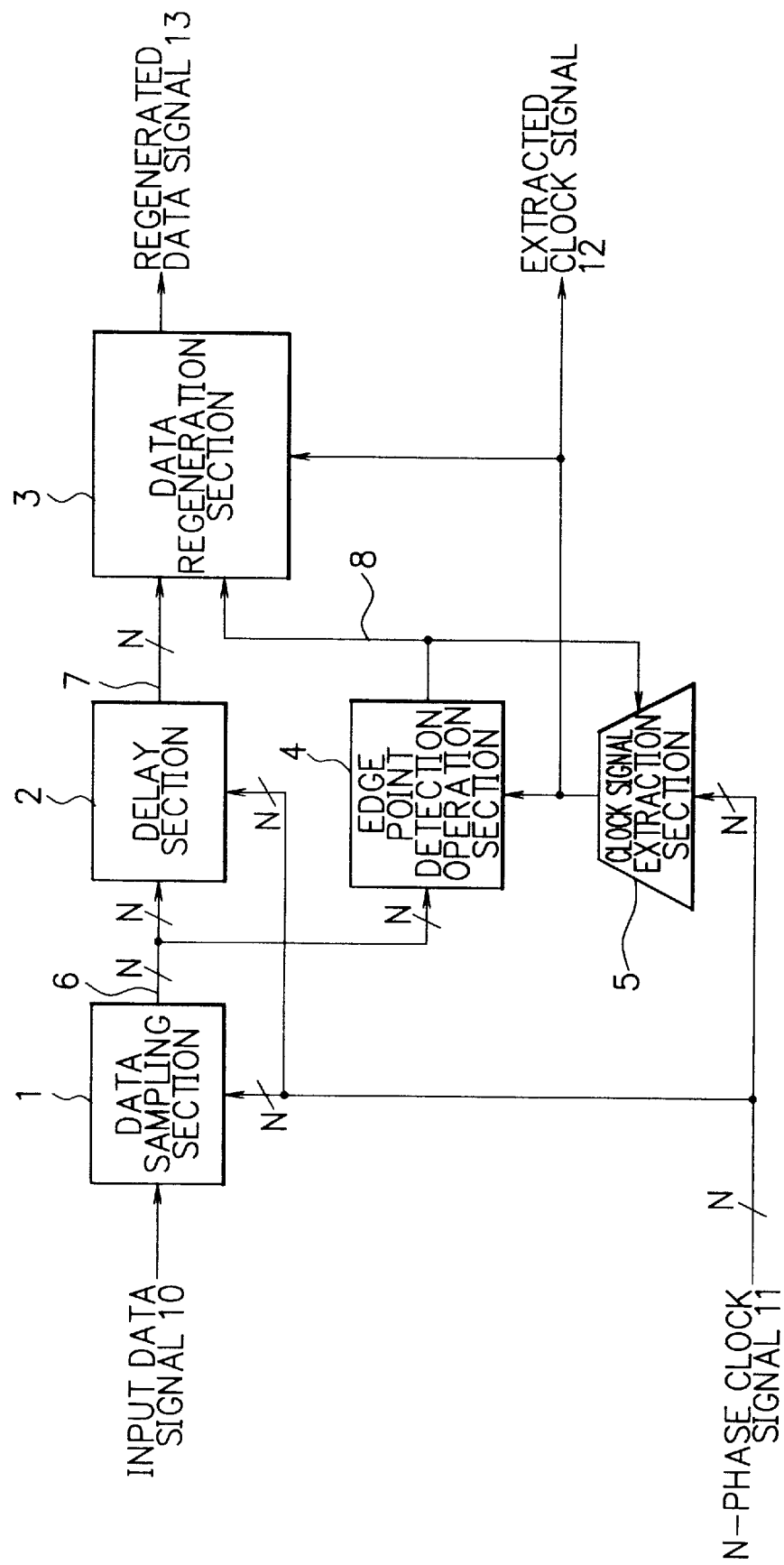
FIG. 6 is a schematic block diagram showing a digital PLL circuit according to an embodiment of the present invention.

FIG. 6 is a schematic block diagram showing a digital PLL circuit according to an embodiment of the present invention.

Referring to FIG. 6, the digital PLL circuit comprises a data sampling section 1, a delay section 2, a data regeneration section 3, a edge point detection operation section 4, and a clock signal extraction section 5.

The data sampling section 1 is supplied with an input data signal 10 and an N-phase clock signal 11 (N: integer larger than 1) which is composed of N clock signals whose phases has been successively shifted by 1/N of the clock cycle, digitally samples the input data signal 10 using the N-phase clock signal 11, and thereby outputs a parallel sample data signal 6 which is composed of N sample data signals.

The delay section 2 is supplied with the N-phase clock signal 11 and the parallel sample data signal 6 which has been outputted by the data sampling section 1, delays the N sample data signals of the parallel sample data signal 6, and outputs a parallel delayed sample data signal 7 which is composed of N delayed sample data signals.

Incidentally, each of the N clock signals composing the N-phase clock signal 11 has a frequency which is almost the same as the bit rate of the input data signal 10, and the phases of the N clock signals have been shifted successively by 1/N (N: integer larger than 1) of the clock cycle.

The edge point detection operation section 4 is supplied with the parallel sample data signal 6 outputted by the data sampling section 1 and an extracted clock signal 12 which is outputted by the clock signal extraction section 5, and outputs an edge point operation output signal 8 including information concerning edge points.

The clock signal extraction section 5 is supplied with the N-phase clock signal 11 and the edge point operation output signal 8 outputted by the edge point detection operation section 4, selects a clock signal from the N clock signals composing the N-phase clock signal 11 based on the information of the edge point operation output signal 8, and outputs the selected clock signal as the extracted clock signal 12.

The data regeneration section 3 is supplied with the parallel delayed sample data signal 7 outputted by the delay section 2, the edge point operation output signal 8 outputted by the edge point detection operation section 4, and the extracted clock signal 12 outputted by the clock signal extraction section 5, selects a delayed sample data signal from the N delayed sample data signals of the parallel delayed sample data signal 7 based on the information of the edge point operation output signal 8, and outputs the selected delayed sample data signal as a regenerated data signal 13.

Incidentally, each of the N clock signals included in the N-phase clock signal 11 will be hereafter referred to by an absolute phase number or a relative phase number. The absolute phase numbers (0, 1, 2, ... , N−1) are assigned to each of the N clock signals of the N-phase clock signal 11, and the absolute phase numbers assigned to the N clock signals do not change with time. The relative phase numbers (0, 1, 2, ... , N−1) are assigned to each of the N clock signals of the N-phase clock signal 11, relative to the extracted clock signal 12 which has been selected out of the N clock signals of the N-phase clock signal 11. Therefore, the relative phase numbers assigned to the N clock signals change with time. When the relative phase numbers are used, a clock signal in the N-phase clock signal 11 which has (almost) the same phase as the input data signal 10 will be referred to as "the 0th clock signal". Therefore, the 0th clock signal in the relative phase number is equal to the extracted clock signal 12. Incidentally, the absolute phase number will also be used for referring to the extracted clock signal 12. A clock signal whose phase is 2 π/N later than the 0th clock signal will be referred to as "the 1st clock signal", and a clock signal whose phase is 2×2 π/N later than the 0th clock signal will be referred to as "the 2nd clock signal". In the same way, a clock signal in the N-phase clock signal 11 whose phase is n×2 π/N later than the 0th clock signal will be referred to as "the n-th clock signal". In the following description, the absolute phase numbers will generally be used, and the relative phase numbers will be used mainly in description concerning edge point detection operation which is executed by the edge point detection operation section 4 and part of data recognition operation which is executed by the data regeneration section 3.

In the following, the components of the digital PLL circuit shown in FIG. 6 will be described more in detail.

The data sampling section 1 digitally samples the input data signal 10 using the N clock signals of the N-phase clock signal 11, and outputs the parallel sample data signal 6 composed of N sample data signals to the delay section 2 and the edge point detection operation section 4.

Each of the N sample data signals included in the parallel sample data signal 6 will be hereafter referred to as follows. A sample data signal which has been generated by sampling the input data signal 10 using the 0th clock signal will be referred to as "the 0th sample data signal". A sample data signal which has been generated by sampling the input data signal 10 using the 1st clock signal will be referred to as "the 1st sample data signal", and a sample data signal which has been generated by sampling the input data signal 10 using the 2nd clock signal will be referred to as "the 2nd sample data signal". In the same way, a sample data signal in the parallel sample data signal 6 which has been generated by sampling the input data signal 10 using the n-th clock signal will be referred to as "the n-th sample data signal". Similarly to the case of the N clock signals in the N-phase clock signal 11, the N sample data signals in the parallel sample data signal 6 will be referred to using absolute numbers or relative numbers.

The edge point detection operation section 4 acquires the parallel sample data signal 6 with timing in sync with the extracted clock signal 12, for example, in sync with the rising edge of the extracted clock signal 12. Incidentally, while the extracted clock signal 12 is selected and outputted by the clock signal extraction section 5 based on the edge point operation output signal 8, in the initial stage where the edge point operation output signal 8 has not been outputted by the edge point detection operation section 4, an arbitrary clock signal is chosen from the N-phase clock signal 11 and outputted as the extracted clock signal 12.

The above description: "the edge point detection operation section 4 acquires the parallel sample data signal 6 in sync with the rising edge of the extracted clock signal 12" means that the edge point detection operation section 4 acquires the 0th through (N−1)-th sample data signals at the moment when the extracted clock signal 12 rises.

The edge point detection operation section 4 detects the positions (phase numbers) of the rising edge and the falling edge of the input data signal 10 by referring to the values of the N sample data signals in the parallel sample data signal 6, and outputs the edge point operation output signal 8 which contains information including the phase number information.

Figure 4:
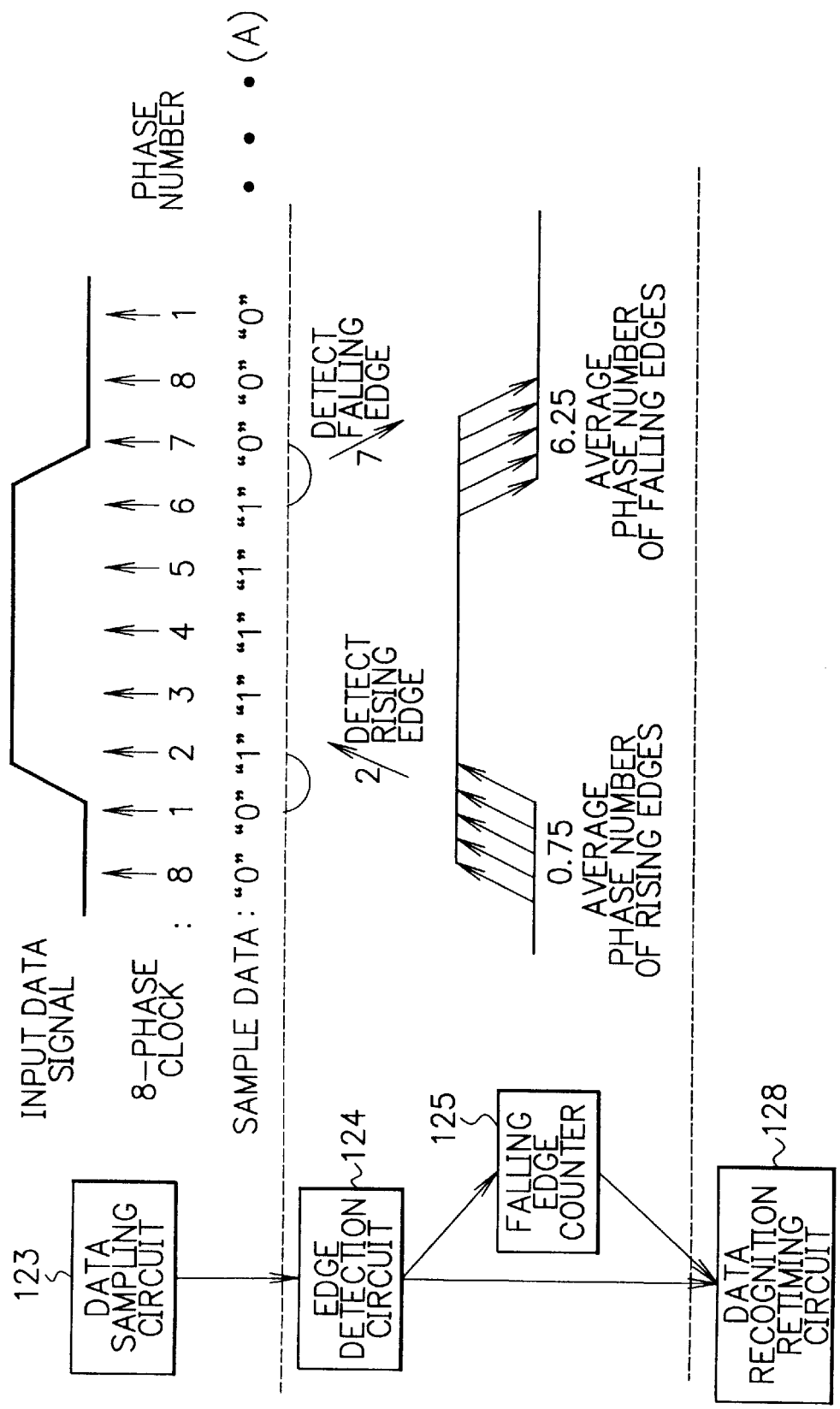
FIG. 4 is a schematic diagram which conceptually explains the operation of the digital PLL circuit of FIG. 3.
Figure 7:
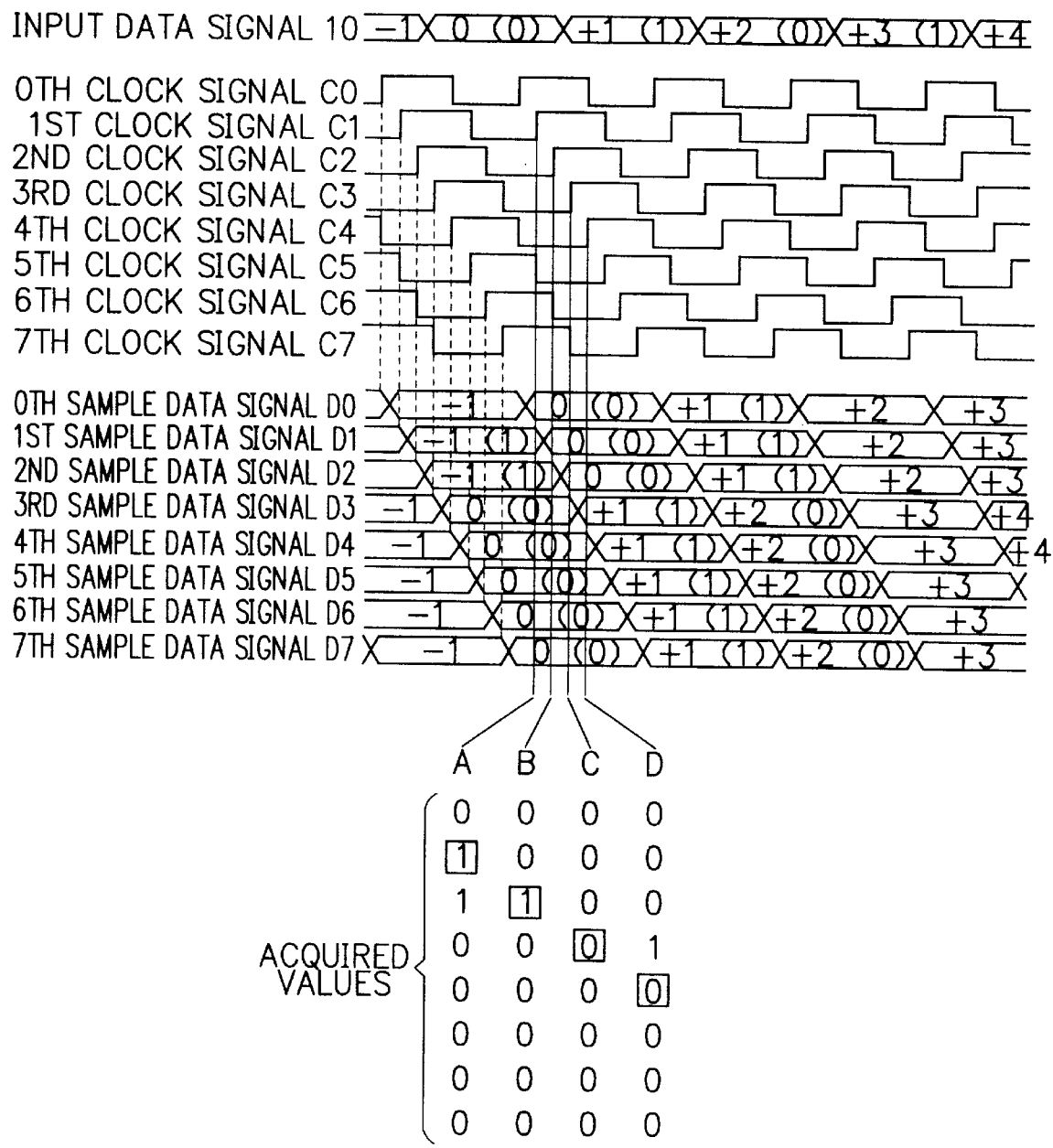
FIG. 7 is a timing chart showing edge point detection operation which is executed by an edge point detection operation section of the digital PLL circuit of FIG. 6.

While the acquisition of the parallel sample data signal 6 and the edge point detection executed by the edge point detection operation section 4 have been briefly explained referring to FIG. 4 in the Description of the Prior Art, it will be described in the following more in detail referring to FIG. 7. In FIG. 7, data bits in the input data signal 10 are assigned serial numbers ... ,−1, 0, 1, 2, ... , and the data bits will be hereafter discriminated using the numbers. In the following, a case where the data bits of the input data signal 10 have alternating 0/1 values (i.e. the values of the data bits −1, 0, 1, 2, ... are 1, 0, 1, 0 ... ) will be explained.

Referring to FIG. 7, the 0th through 7th sample data signals D0~D7 (absolute numbers) have been obtained by the data sampling section 1, by digitally sampling the input data signal 10 using an 8-phase clock signal which includes 0th to 7th clock signals C0~C7 (absolute phase numbers). The sampling by the data sampling section 1 has been executed using rising edges of the 8 clock signals C0~C7. For example, the values of the input data signal 10 at moments when the 0th clock signal C0 rises have been sampled successively as the values of the sample data signals D0. Therefore, in the sample data signal D0, the bit number and its value change according to rising edges of the 0th clock signal C0 as shown in FIG. 7. The bit numbers and their values of other sample data signals D1~D7 (absolute numbers) shown in FIG. 7 change according to the same principle.

In the case where the 1st clock signal C1 (absolute phase number) in the N-phase clock signal 11 has been selected by the clock signal extraction section 5 as the extracted clock signal 12 to be supplied to the edge point detection operation section 4, values of the sample data signals D0~D7 in the parallel sample data signal 6 are acquired by the edge point detection operation section 4 in sync with the rising edge of the 1st clock signal C1 as shown by the line A of FIG. 7. By the acquisition in sync with the rising edge of the 1st clock signal C1 (the line A of FIG. 7), the values of the 0th sample data signal D0 through the 7th sample data signal D7 (absolute numbers) in the parallel sample data signal 6 become 0, 1, 1, 0, 0, 0, 0, 0. In this case, it can be judged that the value of the input data signal 10 has risen from 0 to 1 in sync with the rising edge of the 1st clock signal C1, and it can be judged that the value of the input data signal 10 has fallen from 1 to 0 in sync with the rising edge of the 3rd clock signal C3. In the relative phase number notation regarding the absolute 1st clock signal C1 as the relative 0th clock signal C0 (i.e. the extracted clock signal 12), the values of the 0th sample data signal D0 through the 7th sample data signal D7 (relative numbers) in the parallel sample data signal 6 become 1, 1, 0, 0, 0, 0, 0. 0. Therefore, in the relative phase number notation, the phase number of the falling edge in one cycle of the extracted clock signal 12 is 2, and there is no rising edge in the cycle of the extracted clock signal 12.

In the case where the 2nd clock signal C2 (absolute phase number) in the N-phase clock signal 11 has been selected by the clock signal extraction section 5 as the extracted clock signal 12 to be supplied to the edge point detection operation section 4, values of the sample data signals D0~D7 in the parallel sample data signal 6 are acquired by the edge point detection operation section 4 in sync with the rising edge of the 2nd clock signal C2 as shown by the line B of FIG. 7. By the acquisition in sync with the rising edge of the 2nd clock signal C2 (the line B of FIG. 7), the values of the 0th sample data signal D0 through the 7th sample data signal D7 (absolute numbers) in the parallel sample data signal 6 become 0, 0, 1, 0, 0, 0, 0, 0. In this case, it can be judged that the value of the input data signal 10 has risen from 0 to 1 in sync with the rising edge of the 2nd clock signal C2 and the value of the input data signal 10 has fallen from 1 to 0 in sync with the rising edge of the 3rd clock signal C3. In the relative phase number notation regarding the absolute 2nd clock signal C2 as the relative 0th clock signal C0 (i.e. the extracted clock signal 12), the values of the 0th sample data signal D0 through the 7th sample data signal D7 (relative numbers) in the parallel sample data signal 6 become 1, 0, 0, 0, 0, 0, 0. 0. Therefore, in the relative phase number notation, there is one falling edge at the phase number 1, and there is no rising edge in the cycle of the extracted clock signal 12.

In the case where the 3rd clock signal C3 (absolute phase number) in the N-phase clock signal 11 has been selected as the extracted clock signal 12, values of the sample data signals D0~D7 in the parallel sample data signal 6 are acquired by the edge point detection operation section 4 in sync with the rising edge of the 3rd clock signal C3 as shown by the line C of FIG. 7. By the acquisition in sync with the rising edge of the 3rd clock signal C3 (the line C of FIG. 7), the values of the 0th sample data signal D0 through the 7th sample data signal D7 (absolute numbers) in the parallel sample data signal 6 become 0, 0, 0, 0, 0, 0, 0, 0. In this case, it can be judged that the value of the input data signal 10 has been constantly 0. In the relative phase number notation regarding the absolute 3rd clock signal C3 as the relative 0th clock signal C0 (i.e. the extracted clock signal 12), the values of the 0th sample data signal D0 through the 7th sample data signal D7 (relative numbers) in the parallel sample data signal 6 become 0, 0, 0, 0, 0, 0, 0. 0. Therefore, in the relative phase number notation, there is no rising edge nor falling edge in the cycle of the extracted clock signal 12.

In the case where the 4th clock signal C4 (absolute phase number) in the N-phase clock signal 11 has been selected as the extracted clock signal 12, values of the sample data signals D0~D7 in the parallel sample data signal 6 are acquired by the edge point detection operation section 4 in sync with the rising edge of the 4th clock signal C4 as shown by the line D of FIG. 7. By the acquisition in sync with the rising edge of the 4th clock signal C4 (the line D of FIG. 7), the values of the 0th sample data signal D0 through the 7th sample data signal D7 (absolute numbers) in the parallel sample data signal 6 become 0, 0, 0, 1, 0, 0, 0, 0. In this case, it can be judged that the value of the input data signal 10 has risen from 0 to 1 in sync with the rising edge of the 3rd clock signal C3 and the value of the input data signal 10 has fallen from 1 to 0 in sync with the rising edge of the 4th clock signal C4. In the relative phase number notation regarding the absolute 4th clock signal C4 as the relative 0th clock signal C0 (i.e. the extracted clock signal 12), the values of the 0th sample data signal D0 through the 7th sample data signal D7 (relative numbers) in the parallel sample data signal 6 become 0, 0, 0, 0, 0, 0, 0. 1. Therefore, in the relative phase number notation, there is one rising edge at the phase number 7, and there is no falling edge in the cycle of the extracted clock signal 12.

As shown above, the edge point detection operation section 4 acquires the values of the sample data signals of the parallel sample data signal 6 in sync with the extracted clock signal 12, and detects the positions (i.e. phase numbers) of the rising edge and the falling edge of the input data signal 10 by referring to the acquired values. The edge point detection operation section 4 also obtains the number of rising edges and the number of falling edges during one cycle of the extracted clock signal 12 as described above.

Subsequently, the edge point detection operation section 4 takes the average of the phase numbers of the rising edges in a predetermined period till the moment, and the average of the phase numbers of the falling edges in a predetermined period till the moment.

Figure 8:
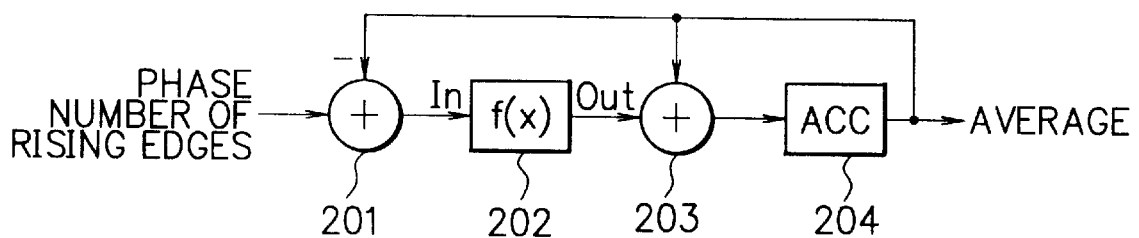
FIG. 8 is a schematic block diagram which conceptually explains averaging operation which is executed by the edge point detection operation section.

In the following, the averaging operation of the edge point detection operation section 4 will be explained referring to FIG. 8. FIG. 8 is a schematic block diagram which conceptually explains the averaging operation which is executed by the edge point detection operation section 4. While averaging operation with respect to rising edges will be explained in the following, averaging with respect to falling edges can also be executed in the same way. The phase number representing the rising edge point of the input data signal 10 which has been detected in the above edge point detection operation is supplied to a subtracter 201. The subtracter 201 is also supplied with an average which has been outputted by an average register 204, and obtains the difference between the phase number and the average. The difference X obtained by the subtracter 201 is supplied to a weight section 202. The weight section 202 weights the difference X according to a predetermined weighting function f(X). The weighting function f(X) can be a linear function such as f(X)=(1/4)X, or other type of a function. The weighting function f(X) can also include a factor concerning elapsed time. The weighted output f(X) of the weight section 202 is supplied to an adder 203. The adder 203 is also supplied with the average from the average register 204, and obtains the sum of the weighted output f(X) and the average. The sum is supplied to the average register 204 as a new average.

Generally, the average obtained by the above averaging operation is not an integer, and can not be utilized digitally as the clock phase number representing the rising edge. Therefore, the average is rounded off to the nearest integer. Incidentally, the phase number representing a rising edge point is supplied to the subtracter 201 of FIG. 8 only when a rising edge point is detected in the above edge point detection operation, therefore, the average phase number of the rising edges is updated only when a new rising edge is detected by the edge point detection operation section 4.

The edge point detection operation section 4 outputs the edge point operation output signal 8, which includes information concerning the average phase number of rising edges, information concerning the average phase number of falling edges, information concerning the number of rising edges during one cycle of the extracted clock signal 12, and information concerning the number of falling edges during one cycle of the extracted clock signal 12, to the clock signal extraction section 5 and the data regeneration section 3 as shown in FIG. 6.

The clock signal extraction section 5, which received the edge point operation output signal 8, selects a clock signal from the N clock signals of the N-phase clock signal 11 based on the average phase number of rising edges or the average phase number of falling edges which has been included in the edge point operation output signal 8 supplied from the edge point detection operation section 4, and outputs the selected clock signal as the extracted clock signal 12 which varies in sync with the edges of the input data signal 10. In the selection of the extracted clock signal 12, a clock signal in the N-phase clock signal 11 that corresponds to the average phase number according to a predetermined rule is selected. For example, in the case of FIG. 7, the 3rd clock signal C3 (in the absolute phase number notation) is selected as the extracted clock signal 12.

Figure 9:
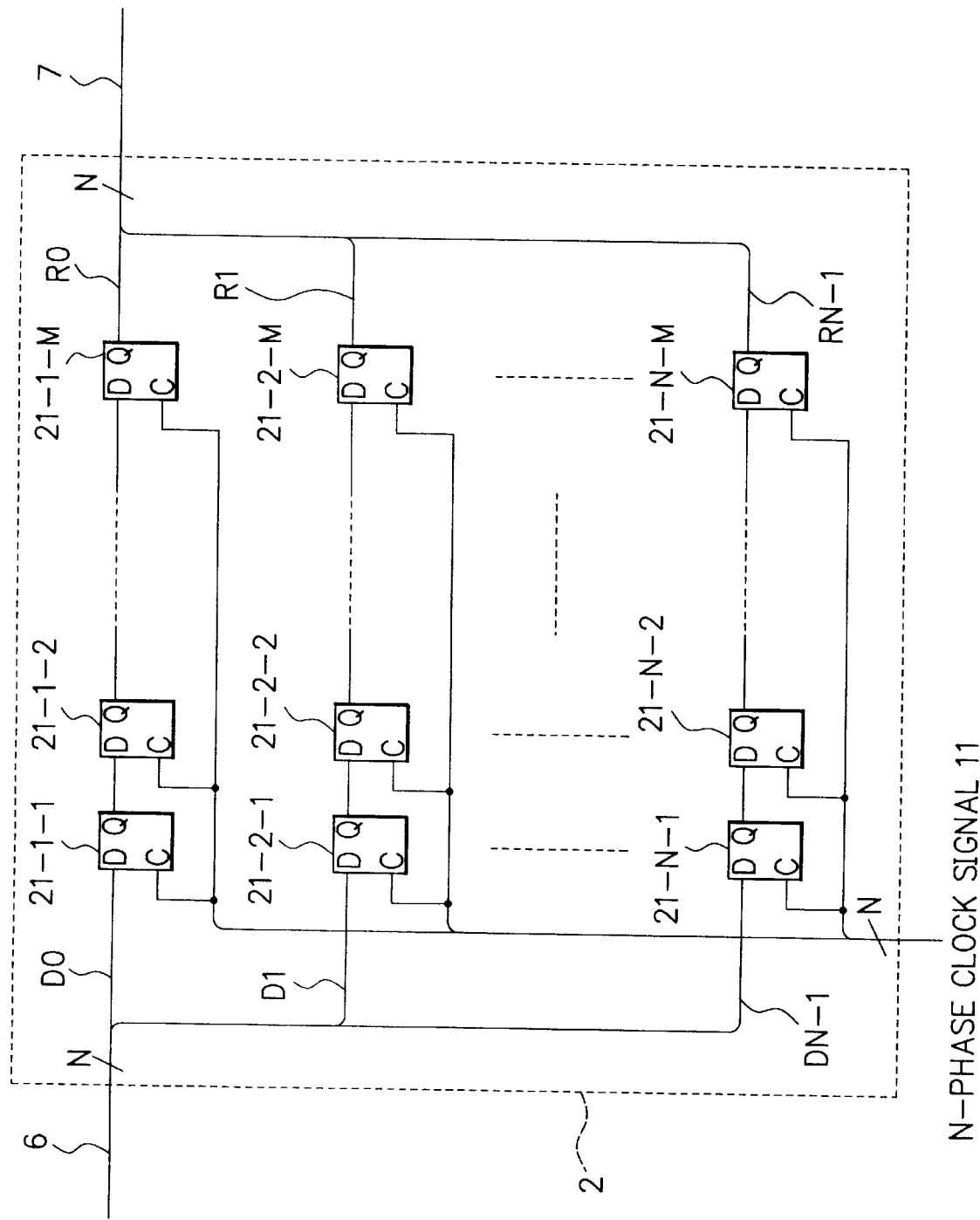
FIG. 9 is a block diagram showing an example of internal composition of a delay section of the digital PLL circuit of FIG. 6.

The delay section 2 shown in FIG. 6 is supplied with the N-phase clock signal 11 and the N sample data signals of the parallel sample data signal 6, delays the N sample data signals using the N-phase clock signal 11 keeping the phase differences between the signals, and outputs the delayed N sample data signals as the parallel delayed sample data signal 7. FIG. 9 is a block diagram showing an example of internal composition of the delay section 2 which is shown in FIG. 6. Referring to FIG. 9, the delay section 2 is composed of N flip-flop lines corresponding to each of the sample data signals in the parallel sample data signal 6. Each flip-flop line is composed of M flip-flops (M: a natural number). Each flip-flop line is supplied with corresponding one of the clock signals in the N-phase clock signal 11. Concretely, the clock terminals of the M flip-flops 21-1-1, 21-1-2, ..., 21-1-M are supplied with the 0th clock signal C0 in the N-phase clock signal 11. The clock terminals of the M flip-flops 21-2-1, 21-2-2, ..., 21-2-M are supplied with the 1st clock signal C1 in the N-phase clock signal 11. In the same way, the clock terminals of the M flip-flops 21-k-1, 21-k-2, ..., 21-k-M are supplied with the (k−1)-th clock signal Ck in the N-phase clock signal 11. Each flip-flop line is supplied with corresponding one of the N sample data signals in the parallel sample data signal 6, delays the corresponding sample data signal by M bits utilizing the corresponding clock signal, and outputs the delayed sample data signal. The N delayed sample data signals outputted by the N flip-flop lines are outputted from the delay section 2 as the parallel delayed sample data signal 7. Therefore, phase differences between the N sample data signals of the parallel sample data signal 6 are kept in the N delayed sample data signals of the parallel delayed sample data signal 7.

Figure 5:
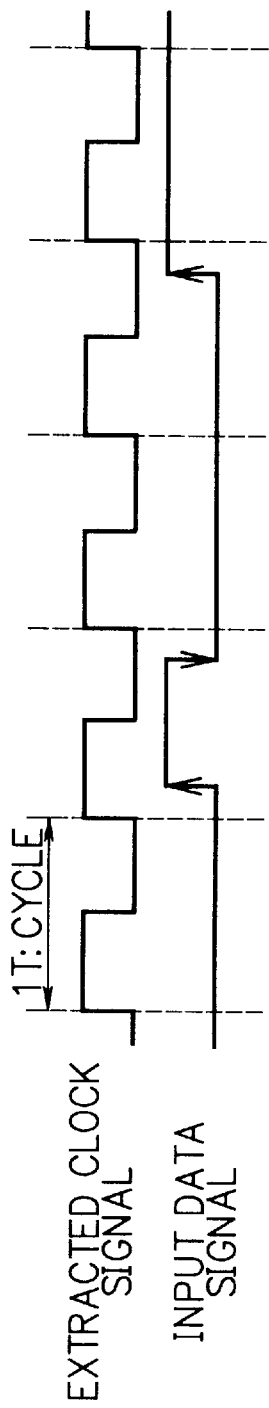
FIG. 5 is a schematic diagram which conceptually explains data regeneration operation of a data recognition retiming circuit of the digital PLL circuit of FIG. 3.

The data regeneration section 3 shown in FIG. 6 is supplied with the edge point operation output signal 8 outputted by the edge point detection operation section 4, the parallel delayed sample data signal 7 outputted by the delay section 2, and the extracted clock signal 12 outputted by the clock signal extraction section 5. The data regeneration section 3 determines the value of the regenerated data signal 13 utilizing the edge point operation output signal 8, the parallel delayed sample data signal 7 and the extracted clock signal 12, and outputs the regenerated data signal 13 with timing in sync with the extracted clock signal 12. The data regeneration section 3 determines the value of the regenerated data signal 13 based on the number of rising/falling edges during one cycle of the extracted clock signal 12, as has been explained in the Description of the Prior Art referring to FIG. 5.

In the following, the operation of the digital PLL circuit of FIG. 6 and the signal regeneration method employed by the digital PLL circuit will be described in detail.

Figure 10:
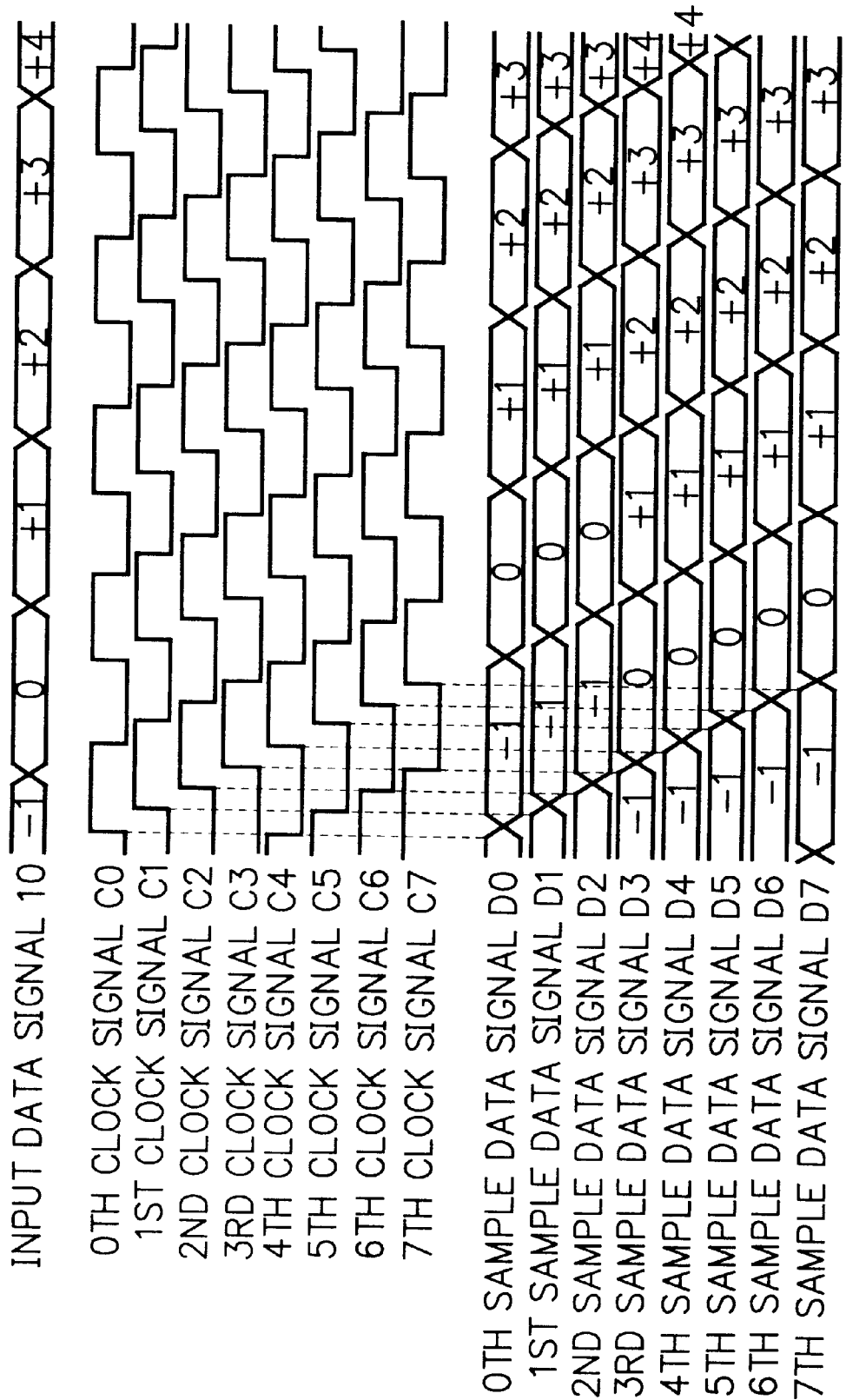
FIG. 10 is a timing chart showing the operation of a data sampling section of the digital PLL circuit of FIG. 6.

First, the operation of the data sampling section 1 will be explained referring to FIG. 10. FIG. 10 is a timing chart showing the operation of the data sampling section 1. Incidentally, a case where the number of phases of the N-phase clock signal 11 is 8 (N=8) will be explained in the following. Referring to FIG. 10, the input data signal 10 supplied to the data sampling section 1 is sampled using the rising edges of the 0th clock signal C0 through the 7th clock signal C7, and the 0th through 7th sample data signals D0~D7 are outputted to the delay section 2 and the edge point detection operation section 4, as the parallel sample data signal 6. Incidentally, the 0th clock signal C0 through the 7th clock signal C7 in the 8-phase clock signal have phases which have been successively shifted by ⅛ of the clock cycle, as shown in FIG. 10.

Figure 11:
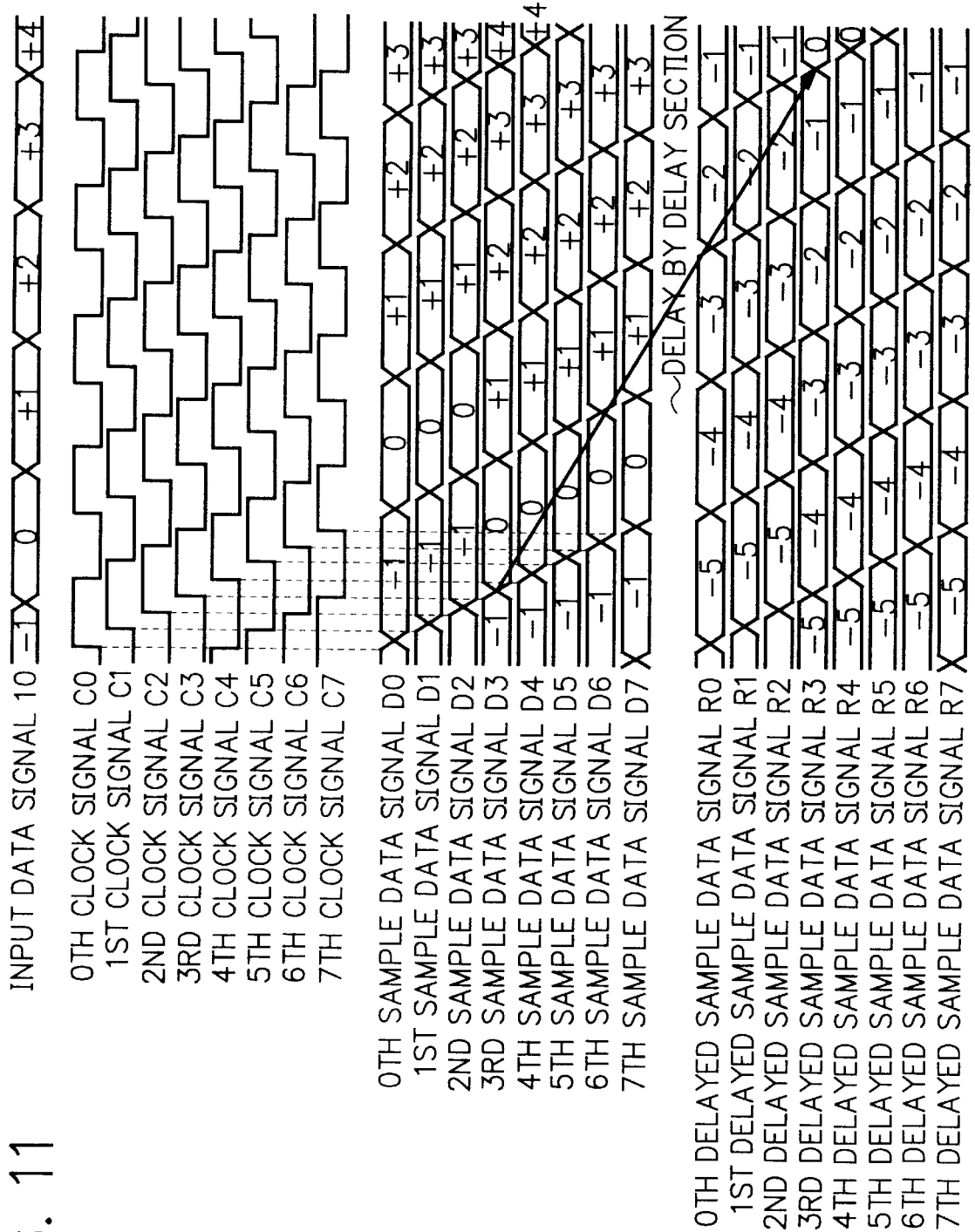
FIG. 11 is a timing chart showing the operation of the delay section.

Next, the operation of the delay section 2 will be explained referring to FIG. 11. FIG. 11 is a timing chart showing the operation of the delay section 2. Incidentally, a case where the number of delay stages (flip-flops) of the flip-flop line is 4 (M=4) will be explained in the following. The sample data signals D0~D7 supplied from the data sampling section 1 are delayed by 4 bits by each flip-flop line using the 8-phase clock signal keeping phase differences between the signals, and are outputted as the delayed sample data signal R0~R7 (i.e. the parallel delayed sample data signal 7). The arrow in FIG. 11 indicates the 4-bit delay of the 3rd delayed sample data signal R3 in comparison with the 3rd sample data signal D3 focusing on the data bit "0".

Figure 12:
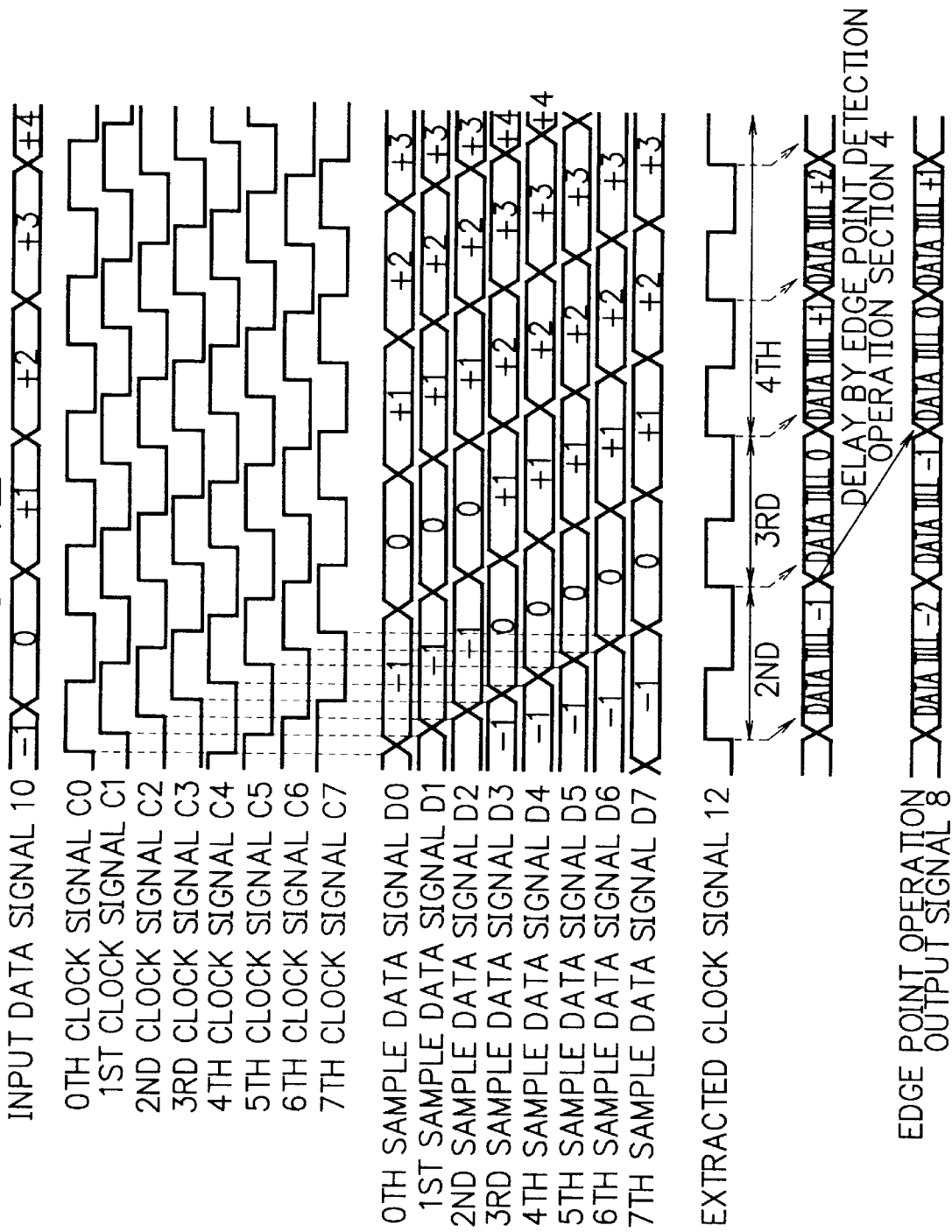
FIG. 12 is a timing chart showing the operation of the edge point detection operation section.

Next, the operation of the edge point detection operation section 4 will be explained referring to FIG. 12. FIG. 12 is a timing chart showing the operation of the edge point detection operation section 4. The edge point detection operation section 4 acquires the 0th sample data signal D0 through the 7th sample data signal D7 in sync with the extracted clock signal 12, detects the clock phase numbers of the rising edge and the falling edge of the input data signal 10 by referring to the acquired sample data signals D0~D7, takes the average of the clock phase numbers concerning the rising edges in a predetermined period till the moment and the average of the clock phase numbers concerning the falling edges in a predetermined period till the moment and obtains the numbers of rising edges and falling edges during one cycle of the extracted clock signal 12, and outputs the edge point operation output signal 8, which includes the information on the average phase number of rising edges, information on the average phase number of falling edges, information concerning the number of rising edges during one cycle of the extracted clock signal 12, and information concerning the number of falling edges during one cycle of the extracted clock signal 12, with timing in sync with the extracted clock signal 12.

In general, the averaging of the phase numbers concerning the rising edge and falling edge (i.e. update of the averages) needs a predetermined processing time. FIG. 12 shows a case where the processing time is within one cycle of the extracted clock signal 12. In FIG. 12, delay time between the input data signal 10 and the edge point operation output signal 8 is equal to one cycle of the extracted clock signal 12.

Incidentally, the "data till −1" shown at the bottom of FIG. 12 means the average phase number of rising edges, the average phase number of falling edges, the number of rising edges during one cycle of the extracted clock signal 12, and the number of falling edges during one cycle of the extracted clock signal 12, which are obtained based on the input data signal 10 till data No.−1. Here, the word "till" is used since the average phase number of rising edges and the average phase number of falling edges are determined based on values of the input data signal 10 in the past. The arrow in FIG. 12 indicates the delay by the edge point detection operation section 4 focusing on the "data till 0".

Figure 13:
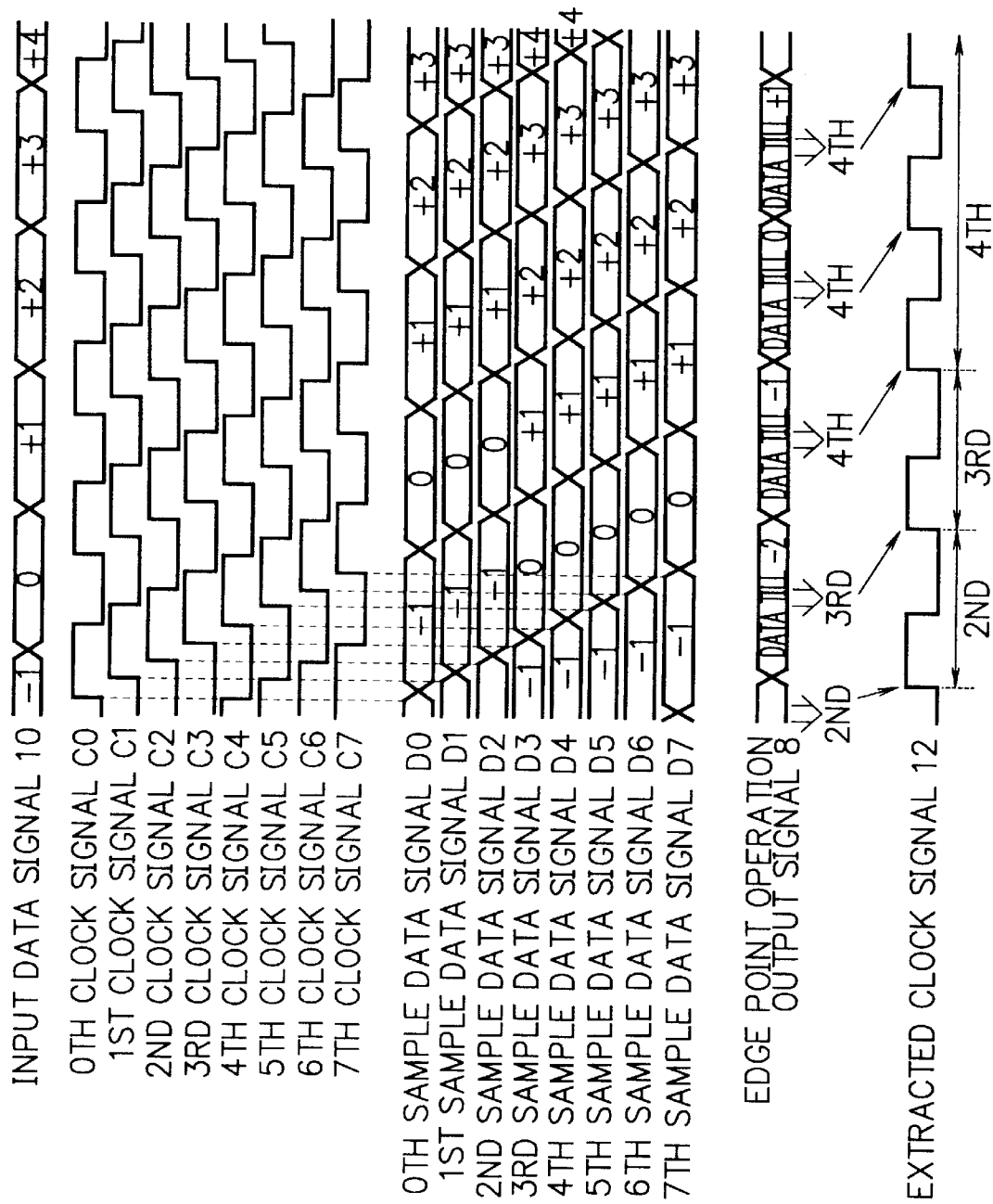
FIG. 13 is a timing chart showing the operation of a clock signal extraction section of the digital PLL circuit of FIG. 6.

Next, the operation of the clock signal extraction section 5 will be explained referring to FIG. 13. FIG. 13 is a timing chart showing the operation of the clock signal extraction section 5. The clock signal extraction section 5 selects one clock signal from the 8 clock signals of the 8-phase clock signal based on the information on the average phase number of rising edges or the information on the average phase number of falling edges in the edge point operation output signal 8, and outputs the selected clock signal as the extracted clock signal 12. For example, the clock signal extraction section 5 can utilize the average phase number of falling edges for selecting the extracted clock signal 12. Referring to FIG. 13, the "data till −2" shows the average phase number of falling edges is 3. The "data till −1" shows the average phase number of falling edges is 4, and ditto for the following data shown in FIG. 13. In the case of FIG. 13, the average phase number of falling edges indicated by the edge point operation output signal 8 varies as 2→3→4, and the selection of the extracted clock signal 12 is executed according to the variation.

Figure 14:
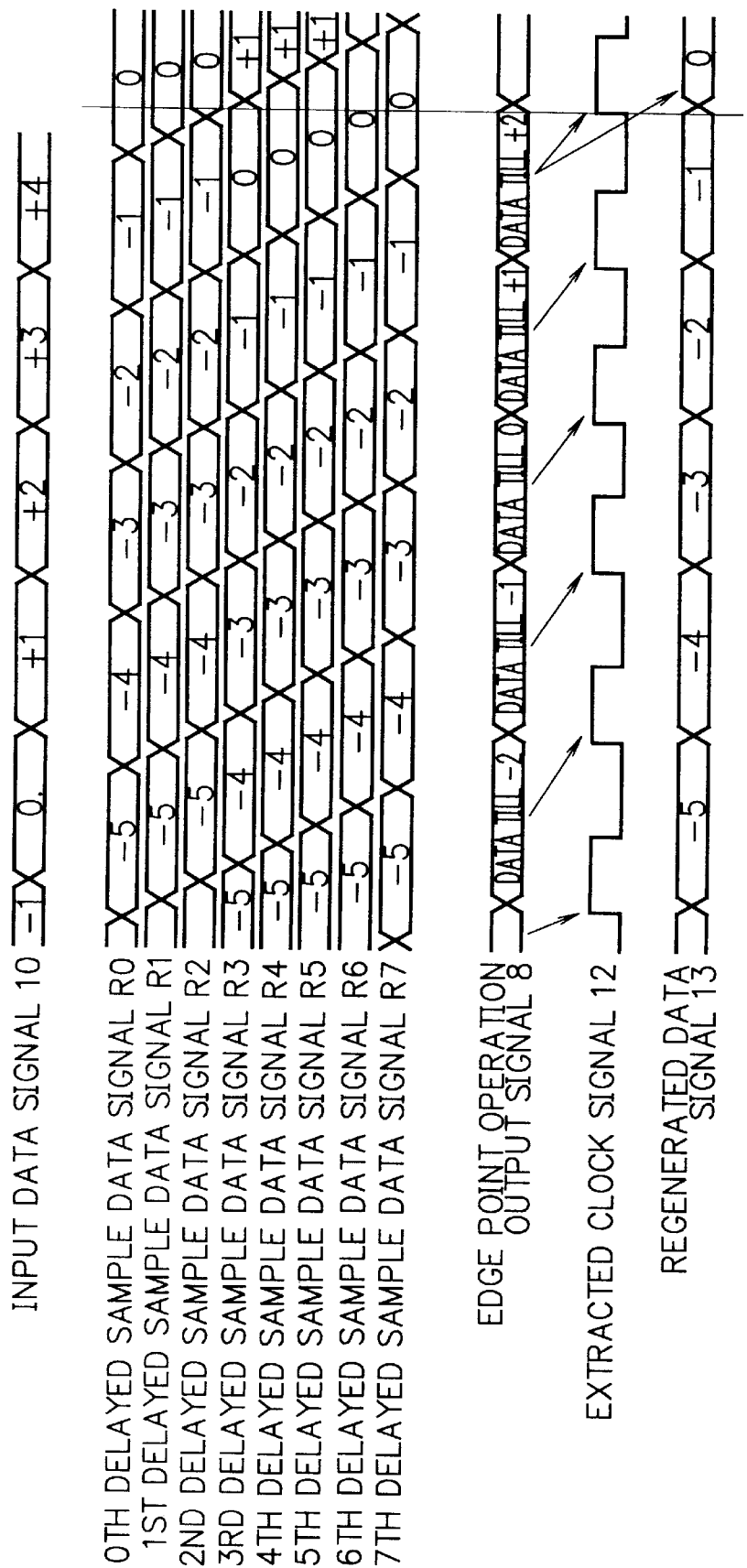
FIG. 14 is a timing chart showing the operation of a data regeneration section of the digital PLL circuit of FIG. 6.

Next, the operation of the data regeneration section 3 will be explained referring to FIG. 14. FIG. 14 is a timing chart showing the operation of the data regeneration section 3. The data regeneration section 3 is supplied with the extracted clock signal 12, the parallel delayed sample data signal 7 including the 0th through 7th delayed sample data signals R0~R7 which have been generated by delaying the sample data signals D0~D7 by 4 bits by the flip-flop lines of the delay section 2 keeping phase differences between the signals, and the edge point operation output signal 8 outputted by the edge point detection operation section 4 which includes information concerning the average phase number of rising edges, the average phase number of falling edges, the number of rising edges, and the number of falling edges.

The data regeneration section 3 selects one delayed sample data signal from the delayed sample data signals R0~R7 based on the information included in the edge point operation output signal 8, and outputs the selected delayed sample data signal as the regenerated data signal 13 with timing in sync with the extracted clock signal 12.

Referring to FIG. 14, when the "data 0" in the input data signal 10 is regenerated, the edge point operation output signal 8 which has been obtained using the "data till+2" of the input data signal 10 and the extracted clock signal 12 which has been selected using the "data till+2" of the input data signal 10 are utilized, since the delay time of the delayed sample data signals R0~R7 is 3 bits longer than that of the edge point operation output signal 8.

Therefore, for example, even in the case where data before the "data 0" does not exist, that is, even in the case where "data −1", "data −2", . . . are all 0, the edge point detection operation section 4 has already finished its operation using the "data till+2" of the input data signal 10, at the moment when regeneration of the first data "data 0" is executed.

In the following, the operation of the data regeneration section 3 will be described more in detail referring to FIG. 15 through FIG. 16D.

Figure 15:
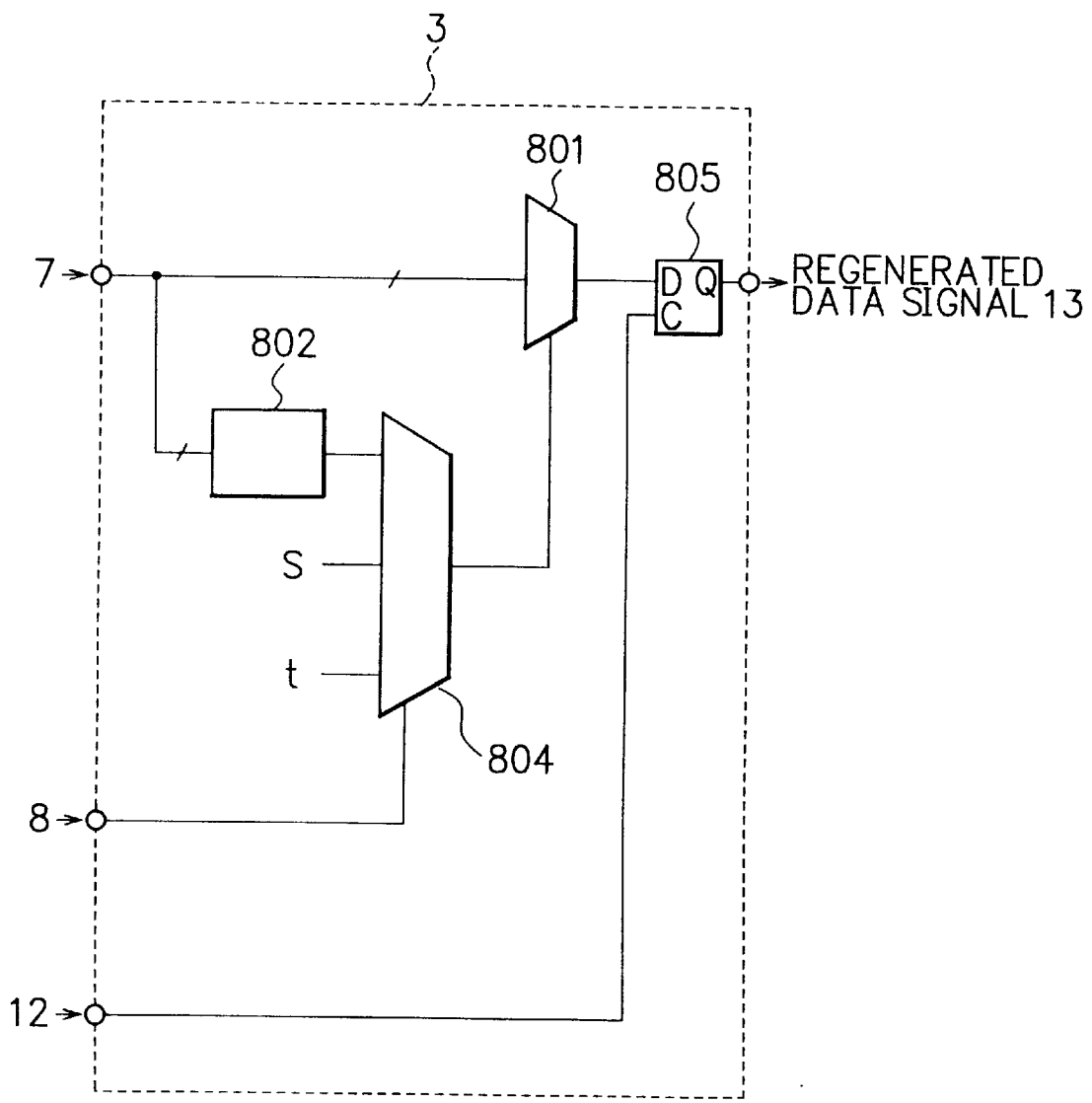
FIG. 15 is a block diagram showing an example of composition of the data regeneration section.

FIG. 15 is a block diagram showing an example of composition of the data regeneration section 3, and FIG. 16A through FIG. 16D are schematic diagrams which conceptually show the operation of the data regeneration section 3 of FIG. 15. Referring to FIG. 15, the data regeneration section 3 is supplied with the extracted clock signal 12 outputted by the clock signal extraction section 5, the parallel delayed sample data signal 7 including the 0th through 7th delayed sample data signals R0~R7 outputted by the delay section 2, and the edge point operation output signal 8 outputted by the edge point detection operation section 4 which includes information concerning the numbers of rising edges and falling edges. The data regeneration section 3 is composed of a selector circuit 801, an encoding section 802, a selector circuit 804, and a flip-flop 805.

Referring to FIG. 15, the encoding section 802 is supplied with the parallel delayed sample data signal 7 including the 0th through 7th delayed sample data signals R0~R7. The encoding section 802 selects one delayed sample data signal that has the earliest edge point from the delayed sample data signals R0~R7, and outputs the phase number of the selected delayed sample data signal to the selector circuit 804. Incidentally, the phase number outputted by the encoding section 802 indicates the position (phase) of a point right after the earliest edge point of the input data signal 10 in one cycle of the extracted clock signal 12.

The selector circuit 804 is supplied with the phase number outputted by the encoding section 802 (which indicates the position of the point right after the earliest edge point of the input data signal 10 in one cycle of the extracted clock signal 12), a predetermined integer "s" ($0 \leq s \leq 7$), a predetermined integer "t" ($0 \leq s \leq 7$), and the edge point operation output signal 8. Here, the edge point operation output signal 8 is inputted to a selection control terminal of the selector circuit 804, and the selector circuit 804 utilizes the numbers of rising edges and falling edges which are indicated by the edge point operation output signal 8.

Based on the numbers of rising edges and falling edges which are supplied to the selection control terminal, the selector circuit 804 executes selection from the three inputs: the integer "s", the integer "t", and the phase number outputted by the encoding section 802. In the case where the number of rising edges is 0 and the number of falling edges is 1, the selector circuit 804 selects the integer "s" from the three inputs and outputs the integer "s". In the case where the number of rising edges is 1 and the number of falling edges is 0, the selector circuit 804 selects the integer "t" from the three inputs and outputs the integer "t". In the case where the number of rising edges is 1 and the number of falling edges is 1, the selector circuit 804 selects the phase number outputted by the encoding section 802 from the three inputs and outputs the phase number. And in the case where the number of rising edges is 0 and the number of falling edges is 0, the selector circuit 804 selects the integer "s" (or "t") from the three inputs and outputs the integer "s" (or "t").

The selector circuit 801 is supplied with the selection output of the selector circuit 804 and the parallel delayed sample data signal 7 including the 0th through 7th delayed sample data signals R0~R7. The selector circuit 801 selects one delayed sample data signal from the delayed sample data signals R0~R7 based on the selection output (0, 1, 2, 3, 4, 5, 6 or 7) of the selector circuit 804, and outputs the selected delayed sample data signal to the flip-flop 805.

The flip-flop 805 executes re-timing to the selected delayed sample data signal supplied from the selector circuit 801 using the extracted clock signal 12 as its clock signal, and outputs the re-timed delayed sample data signal as the regenerated data signal 13.

In the following, the operation of the data regeneration section 3 will be described more concretely referring to FIG. 16A through FIG. 16D. Incidentally, in the following, a case where s=t=4 are employed and N=8 (the input data signal 10 is sampled using 8-phase clock signal) will be described.

Figure 16A:
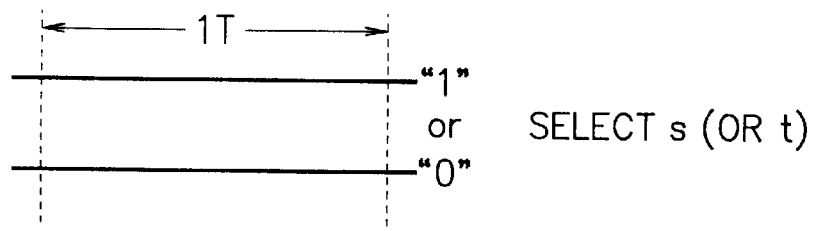
FIG. 16A through FIG. 16D are schematic diagrams which conceptually show the operation of the data regeneration section of FIG. 15.
Figure 16B:
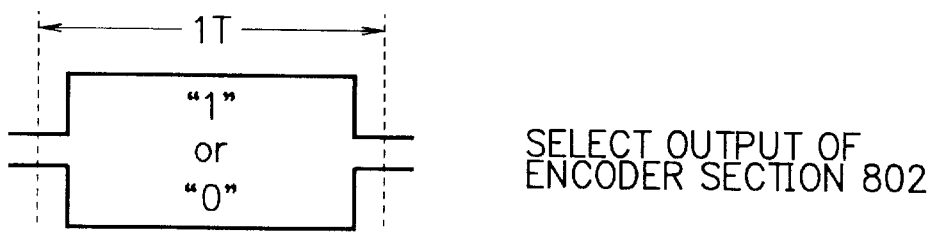
Figure 16C:
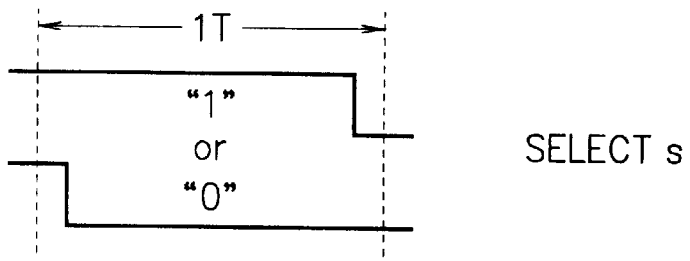
Figure 16D:
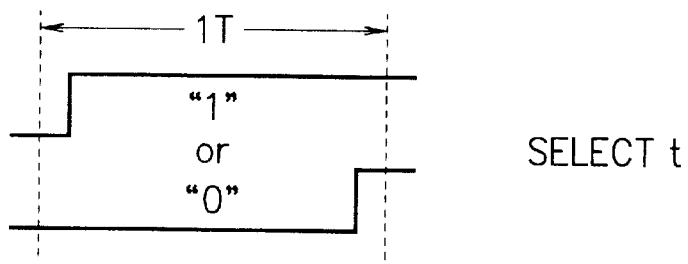

FIG. 16C and FIG. 16D show cases where the number of edge points in one cycle of the extracted clock signal 12 is 1.

In the case where the numbers of rising edges and falling edges indicated by the edge point operation output signal 8 are 0 and 1, it can be judged that the input data signal 10 has varied like the upper line or the lower line in FIG. 16C. In this case, s (=4) is selected by the selector circuit 804 and outputted to the selector circuit 801. The selector circuit 801 which received the integer s (=4) selects one delayed sample data signal from the parallel delayed sample data signal 7 according to the integer s(=4) supplied from the selector circuit 804. According to the integer s=4, one delayed sample data signal that corresponds to a phase π (180°) in the cycle T of the extracted clock signal 12 is selected and outputted by the selector circuit 801. Therefore, the value "1" is outputted by the selector circuit 801 in the case of the upper line of FIG. 16C, and the value "0" is outputted by the selector circuit 801 in the case of the lower line of FIG. 16C.

In the case where the numbers of rising edges and falling edges indicated by the edge point operation output signal 8 are 1 and 0, it can be judged that the input data signal 10 has varied like the upper line or the lower line in FIG. 16D. In this case, t (=4) is selected by the selector circuit 804 and outputted to the selector circuit 801. The selector circuit 801 which received the integer t (=4) selects one delayed sample data signal from the parallel delayed sample data signal 7 according to the integer t(=4) supplied from the selector circuit 804. According to the integer t=4, one delayed sample data signal that corresponds to a phase π (180°) in the cycle T of the extracted clock signal 12 is selected and outputted by the selector circuit 801. Therefore, the value "1" is outputted by the selector circuit 801 in the case of the upper line of FIG. 16D, and the value "0" is outputted by the selector circuit 801 in the case of the lower line of FIG. 16D.

FIG. 16B shows cases where the number of edge points in one cycle of the extracted clock signal 12 is 2. In the case where the numbers of rising edges and falling edges indicated by the edge point operation output signal 8 are 1 and 1, it can be judged that the input data signal 10 has varied like the upper line or the lower line in FIG. 16B. In this case, the phase number supplied from the encoding section 802 (which indicates the position of the point right after the earliest edge point of the input data signal 10 in one cycle of the extracted clock signal 12) is selected by the selector circuit 804 and outputted to the selector circuit 801. The selector circuit 801 which received the phase number selects one delayed sample data signal from the parallel delayed sample data signal 7 according to the phase number supplied from the selector circuit 804. According to the phase number, one delayed sample data signal that corresponds to the point right after the earliest edge point of the input data signal 10 in the cycle of the extracted clock signal 12 is selected and outputted by the selector circuit 801. Therefore, the value "1" is outputted by the selector circuit 801 in the case of the upper line of FIG. 16B, and the value "0" is outputted by the selector circuit 801 in the case of the lower line of FIG. 16B.

FIG. 16A shows cases where the number of edge points in one cycle of the extracted clock signal 12 is 0. In the case where the numbers of rising edges and falling edges indicated by the edge point operation output signal 8 are 0 and 0, it can be judged that the input data signal 10 has varied like the upper line or the lower line in FIG. 16A. In this case, s (=4) (or t (=4)) is selected by the selector circuit 804 and outputted to the selector circuit 801. The selector circuit 801 which received the integer s (=4) (or t (=4)) selects one delayed sample data signal from the parallel delayed sample data signal 7 according to the integer s (=4) (or t (=4)) supplied from the selector circuit 804. According to the integer s=4 (or t=4), one delayed sample data signal that corresponds to a phase π (180°) in the cycle T of the extracted clock signal 12 is selected and outputted by the selector circuit 801. Therefore, the value "1" is outputted by the selector circuit 801 in the case of the upper line of FIG. 16A, and the value "0" is outputted by the selector circuit 801 in the case of the lower line of FIG. 16A.

In the case where the number of rising/falling edges indicated by the edge point operation output signal 8 is 3 or more, s (=4) (or t (=4)) is selected by the selector circuit 804 and outputted to the selector circuit 801, similarly to the above case. The selector circuit 801 which received the integer s (=4) (or t (=4)) selects one delayed sample data signal from the parallel delayed sample data signal 7 according to the integer s (=4) (or t (=4)) supplied from the selector circuit 804. According to the integer s=4 (or t=4), one delayed sample data signal that corresponds to a phase π (180°) in the cycle T of the extracted clock signal 12 is selected and outputted by the selector circuit 801.

Subsequently, the delayed sample data signal which has been selected and outputted by the selector circuit 801 is re-timed by the flip-flop 805 using the extracted clock signal 12 as its clock signal, and the re-timed delayed sample data signal is outputted from the digital PLL circuit as the regenerated data signal 13 which is in sync with the extracted clock signal 12.

Incidentally, while the integers "s" and "t" were set at 4 and 4 in the above explanation so that one delayed sample data signal that corresponds to the phase π (180°) in the cycle T of the extracted clock signal 12 will be selected by the selector circuit 801 and thereby a regenerated data signal 13 (i.e. a re-timed output) having strong resistance to jitter of the input data signal 10 can be realized, the integers "s" and "t" can also be set at other values. If the jitter pattern of rising edges is the same as that of falling edges, the setting s=t=4 is the most appropriate. However, there are cases where the jitter pattern of rising edges is different from that of falling edges depending on communication systems, circuit composition, etc. In such cases, the integers "s" and "t" can be set at 3, 5, etc.

As described above, in the digital PLL circuit and the signal regeneration method according to the embodiment of the present invention, the delay section 2 for delaying the parallel sample data signal 6 by a predetermined period is provided between the data sampling section 1 and the data regeneration section 3. Due to the delay by the delay section 2, the operation of the edge point detection operation section 4 for obtaining the average phase number of rising edges and the average phase number of falling edges and the operation of the clock signal extraction section 5 for selecting the extracted clock signal 12 using the average phase number can be executed and completed (apparently) prior to the signal regeneration (selection) operation of the data regeneration section 3.

Therefore, by the digital PLL circuit of the embodiment, the regenerated data signal 13 which is in sync with the extracted clock signal 12 can be obtained without errors and with quick extraction, even in the case where the number of bits of the overhead in the input data signal 10 is decreased for the "efficient use of the data area".

The edge point detection operation section 4 obtains the average phase number of rising/falling edges which follows the phase of the center point of jitter of rising/falling edges of the input data signal 10. The clock signal extraction section 5 selects the extracted clock signal 12 from the N clock signals of the N-phase clock signal 11 based on the average phase number of rising/falling edges obtained by the edge point detection operation section 4. Therefore, the extracted clock signal 12 can be generated as a clock signal that is in sync with the input data signal 10 and that follows phase variation of the input data signal 10. Therefore, phase lock of the digital PLL circuit to the input data signal 10 can be maintained and the regenerated data signal 13 without errors can be outputted even if the input data signal 10 involved phase fluctuation such as jitter, duty distortion, etc. The phase lock of the digital PLL circuit to the input data signal 10 can be maintained even if frequency deviation between the input data signal 10 and the N-phase clock signal 11 existed.

The regenerated data signal 13 is outputted by the data regeneration section 3 with timing in sync with the extracted clock signal 12. Generally, devices which are connected after the digital PLL circuit and which are supplied with the regenerated data signal 13 are also supplied with the extracted clock signal 12 from the digital PLL circuit and operate according to the extracted clock signal 12. By the synchronization between the extracted clock signal 12 and the regenerated data signal 13, design of a system including the digital PLL circuit can be done easier providing appropriate timing.

Figure 17:
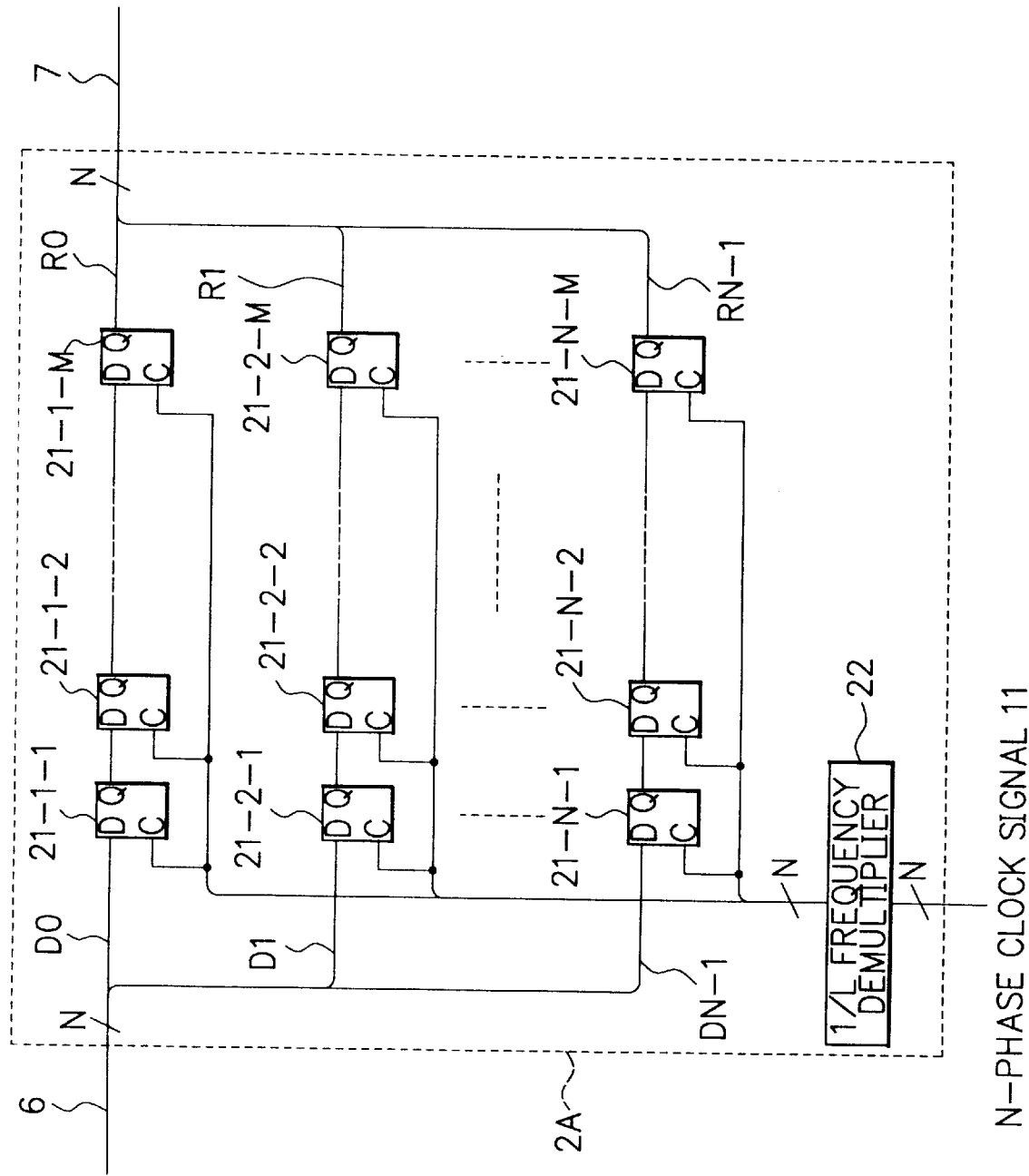
FIG. 17 is a block diagram showing internal composition of another delay section which can be employed in place of the delay section of the digital PLL circuit of FIG. 6.

FIG. 17 is a block diagram showing internal composition of another delay section 2A which can be employed in place of the delay section 2 of the above embodiment. Referring to FIG. 17, the delay section 2A is composed of the N flip-flop lines corresponding to each of the N sample data signals in the parallel sample data signal 6, and a 1/L frequency demultiplier 22. The 1/L frequency demultiplier 22 is provided to the delay section 2A in order to demultiply the frequencies of the N clock signals in the N-phase clock signal 11 by L (an integer larger than 1). The N sample data signals supplied to corresponding flip-flop lines respectively are delayed by the flip-flop lines by M×L bits, and outputted to the data regeneration section 3 as the parallel delayed sample data signal 7. By use of the delay section 2A including the 1/L frequency demultiplier 22, the number of delay stages (flip-flops) per a predetermined delay time of the flip-flop line can be decreased. For example, in the case where N=8 and M=4 (the delay time is 4 bits), while the delay section 2 shown in FIG. 9 needs 32 flip-flops, only 8 flip-flops are necessary in the delay section 2A shown in FIG. 17. Therefore, the delay section 2A realizes reduced circuit scale and power consumption of the digital PLL circuit.

As set forth hereinabove, in the digital PLL circuit and the signal regeneration method according to the present invention, an input data signal 10 is digitally sampled by a data sampling section 1 using an N-phase clock signal 11 (N: integer larger than 1) including N clock signals whose frequencies are almost the same as the bit rate of the input data signal 10 and whose phases has been successively shifted by 1/N of the clock cycle, and thereby a parallel sample data signal 6 including N sample data signals is obtained. An edge point detection operation section 4 detects edge points in the N sample data signals in one cycle of an extracted clock signal 12 and outputs an edge point operation output signal 8 which includes information on the edge points in one cycle of the extracted clock signal 12. A clock signal extraction section 5 selects a clock signal from the N clock signals of the N-phase clock signal 11 based on the information of the edge point operation output signal 8 and outputs the selected clock signal as the extracted clock signal 12. A delay section 2 delays the N sample data signals of the parallel sample data signal 6 and thereby outputs a parallel delayed sample data signal 7 including N delayed sample data signals. A data regeneration section 3 selects a delayed sample data signal from the N delayed sample data signals of the parallel delayed sample data signal 7 based on the information of the edge point operation output signal 8 and outputs the selected delayed sample data signal as a regenerated data signal 13.

Due to the delay by the delay section 2, the operation of the edge point detection operation section 4 for generating the edge point operation output signal 8 including information on the edge points in one cycle of the extracted clock signal 12 and the operation of the clock signal extraction section 5 for selecting the extracted clock signal 12 from the N-phase clock signal 11 based on the information of the edge point operation output signal 8 can be executed and completed (apparently) prior to the signal regeneration (selection) operation of the data regeneration section 3. In other words, the data regeneration section 3 is given a grace period for executing selection and outputting the regenerated data signal 13. Therefore, even in the case where the number of bits of the overhead in the input data signal 10 is decreased for the "efficient use of the data area", regeneration of the input data signal 10 can be executed with no error and with quick extraction, and thus both the "quicker extraction" and the "efficient use of the data area" can be realized.

Therefore, in a digital PLL circuit that is required to extract and output the extracted clock signal 12 and the regenerated signal 13 from the burst input data signal 10 with high speed operation in a few bits, for example, in a digital PLL circuit provided in subscriber's optical communication devices, the extraction time can arbitrarily be decreased without deteriorating the "resistance to jitter and duty distortion of the input data signal" along with realizing the "efficient use of the data area", only by adequately setting the number of the delay steps (i.e. the delay time) of the delay section 2.

The delay time of the delay section 2 can be set so that time necessary for obtaining the extracted clock signal 12 based on a parallel sample data signal 6 will not become longer than time necessary for obtaining the regenerated data signal 13 from the parallel sample data signal 6. By such setting of the delay time, extraction time of the digital PLL circuit can be decreased to 0 bit and the regeneration of the input data signal 10 without errors can be executed from the first bit of the burst input data signal 10.

The delay section 2 can be realized, for example, by N flip-flop lines each of which including M stages of flip-flops (M: natural number), as has been shown in FIG. 9. Each flip-flop line is supplied with corresponding one of the N clock signals of the N-phase clock signal 11 to clock terminals of its M flip-flops and delays corresponding one of the N sample data signals of the parallel sample data signal 6 by M bits. By use of the flip-flops, the N sample data signals of the parallel sample data signal 6 can be delayed correctly and precisely, keeping phase differences between the signals.

The delay section 2 can also be realized, for example, by the delay section 2A which includes a 1/L frequency demultiplier 22 for demultiplying the frequencies of the N clock signals of the N-phase clock signal 11 by L (L: integer larger than 1) and N flip-flop lines each of which including M stages of flip-flops (M: natural number), as has been shown in FIG. 17. Each flip-flop line is supplied with corresponding one of the N clock signals of the N-phase clock signal 11 whose frequency has been demultiplied by the 1/L frequency demultiplier to clock terminals of its M flip-flops and delays corresponding one of the N sample data signals of the parallel sample data signal 6 by M×L bits. By use of the 1/L frequency demultiplier 22, the number of flip-flops per a predetermined delay time of the flip-flop line can be decreased, and thus reduced circuit scale and power consumption of the digital PLL circuit can be realized.

The edge point detection operation section 4 executes selection of the regenerated data signal 13 from the N delayed sample data signals of the parallel delayed sample data signal 7, based on the information of the edge point operation output signal 8. The edge point operation output signal 8 can include information on the number of edge points of the input data signal 10 in one cycle of the extracted clock signal 12, as in the above embodiment. By use of the information on the number of edge points, the edge point detection operation section 4 can execute the selection of the regenerated data signal 13 (data recognition) with high efficiency and high precision.

The edge point operation output signal 8 can include information on the average of the phase numbers that indicate rising edges or falling edges of the input data signal 10 in a predetermined period. The average phase number follows the position of the center point of jitter of rising/falling edges of the input data signal 10. Therefore, in the case where the average phase number is utilized by the clock signal extraction section 5 for the selection of the extracted clock signal 12 as in the above embodiment, the extracted clock signal 12 can be made a clock signal that is in sync with the input data signal 10 and that follows phase variation of the input data signal 10. Therefore, phase lock of the digital PLL circuit to the input data signal 10 can be maintained and the regenerated data signal 13 without errors can be outputted even if the input data signal 10 involved phase fluctuation such as jitter, duty distortion, etc. In other words, the "resistance to jitter and duty distortion of the input data signal" can be improved along with realizing the "quick extraction" and the "efficient use of the data area". The phase lock of the digital PLL circuit to the input data signal 10 can be maintained even if frequency deviation between the input data signal 10 and the N-phase clock signal 11 existed.

In the case where the regenerated signal 13 is outputted by the data regeneration section 3 with timing in sync with the extracted clock signal 12 as in the above embodiment, appropriate timing can easily be provided between the digital PLL circuit and devices which are connected after the digital PLL circuit. Therefore, systems including the digital PLL circuit can be designed easier.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital PLL circuit comprising:

a data sampling means which is supplied with an input data signal and an N-phase clock signal (N: integer larger than 1) including N clock signals whose frequencies are almost the same as the bit rate of the input data signal and whose phases has been successively shifted by 1/N of the clock cycle, for digitally sampling the input data signal using the N clock signals and thereby outputting a parallel sample data signal including N sample data signals;

an edge point detection operation means for acquiring the N sample data signals of the parallel sample data signal, detecting edge points in the acquired N sample data signals in one cycle of an extracted clock signal, and outputting an edge point operation output signal which includes information on the edge points in one cycle of the extracted clock signal;

a clock signal extraction means which is supplied with the N-phase clock signal and the edge point operation output signal outputted by the edge point detection operation means, for selecting a clock signal from the N clock signals of the N-phase clock signal based on the information of the edge point operation output signal and outputting the selected clock signal as the extracted clock signal;

a delay means for delaying the N sample data signals of the parallel sample data signal supplied from the data sampling means and thereby outputting a parallel delayed sample data signal including N delayed sample data signals; and a data regeneration means which is supplied with the parallel delayed sample data signal outputted by the delay means and the edge point operation output signal outputted by the edge point detection operation means, for selecting a delayed sample data signal from the N delayed sample data signals of the parallel delayed sample data signal based on the information of the edge point operation output signal and outputting the selected delayed sample data signal as a regenerated data signal.

2. A digital PLL circuit as claimed in claim 1, wherein the extracted clock signal extracted by the clock signal extraction means is outputted to the outside of the digital PLL circuit.

3. A digital PLL circuit as claimed in claim 1, wherein the delay time of the delay means is set so that time necessary for obtaining the extracted clock signal based on a parallel sample data signal will not become longer than time necessary for obtaining the regenerated data signal from the parallel sample data signal.

4. A digital PLL circuit as claimed in claim 1, wherein the delay means delays the N sample data signals of the parallel sample data signal keeping phase differences between the N sample data signals.

5. A digital PLL circuit as claimed in claim 1, wherein the delay means includes N flip-flop lines each of which including M stages of flip-flops (M: natural number), and each flip-flop line is supplied with corresponding one of the N clock signals of the N-phase clock signal to clock terminals of its M flip-flops and delays corresponding one of the N sample data signals of the parallel sample data signal by M bits.

6. A digital PLL circuit as claimed in claim 1, wherein the delay means includes a 1/L frequency demultiplier for demultiplying the frequencies of the N clock signals of the N-phase clock signal by L (L: integer larger than 1) and N flip-flop lines each of which including M stages of flip-flops (M: natural number), and each flip-flop line is supplied with corresponding one of the N clock signals of the N-phase clock signal whose frequency has been demultiplied by the 1/L frequency demultiplier to clock terminals of its M flip-flops and delays corresponding one of the N sample data signals of the parallel sample data signal by M×L bits.

7. A digital PLL circuit as claimed in claim 1, wherein the edge point operation output signal outputted by the edge point detection operation means includes information on the phase number of a clock signal in the N clock signals of the N-phase clock signal that indicates a rising edge of the input data signal.

8. A digital PLL circuit as claimed in claim 7, wherein the edge point operation output signal outputted by the edge point detection operation means includes information on the number of edge points of the input data signal in one cycle of the extracted clock signal.

9. A digital PLL circuit as claimed in claim 7, wherein the edge point operation output signal outputted by the edge point detection operation means includes information on the average of the phase numbers that indicate the rising edges of the input data signal in a predetermined period.

10. A digital PLL circuit as claimed in claim 1, wherein the edge point operation output signal outputted by the edge point detection operation means includes information on the phase number of a clock signal in the N clock signals of the N-phase clock signal that indicates a falling edge of the input data signal.

11. A digital PLL circuit as claimed in claim 10, wherein the edge point operation output signal outputted by the edge point detection operation means includes information on the number of edge points of the input data signal in one cycle of the extracted clock signal.

12. A digital PLL circuit as claimed in claim 10, wherein the edge point operation output signal outputted by the edge point detection operation means includes information on the average of the phase numbers that indicate the falling edges of the input data signal in a predetermined period.

13. A digital PLL circuit as claimed in claim 12, wherein the clock signal extraction means utilizes the information on the average of the phase numbers that indicate the falling edges of the input data signal for the selection of the extracted clock signal.

14. A digital PLL circuit as claimed in claim 1, wherein the edge point detection operation means acquires the N sample data signals of the parallel sample data signal with timing in sync with the extracted clock signal.

15. A digital PLL circuit as claimed in claim 9, wherein the clock signal extraction means utilizes the information on the average of the phase numbers that indicate the rising edges of the input data signal for the selection of the extracted clock signal.

16. A digital PLL circuit as claimed in claim 1, wherein the data regeneration means is supplied with the extracted clock signal outputted by the clock signal extraction means, and outputs the regenerated data signal with timing in sync with the extracted clock signal.

17. A signal regeneration method comprising the steps of:
  a data sampling step in which an input data signal is digitally sampled using an N-phase clock signal (N: integer larger than 1) including N clock signals whose frequencies are almost the same as the bit rate of the input data signal and whose phases has been successively shifted by 1/N of the clock cycle, and thereby a parallel sample data signal including N sample data signals is obtained;
  an edge point detection operation step in which the N sample data signals of the parallel sample data signal are acquired, edge points in the acquired N sample data signals in one cycle of an extracted clock signal are detected, and an edge point operation output signal which includes information on the edge points in one cycle of the extracted clock signal is generated;
  a clock signal extraction step in which the extracted clock signal is selected from the N clock signals of the N-phase clock signal based on the information of the edge point operation output signal;
  a delay step in which the N sample data signals of the parallel sample data signal are delayed and thereby a parallel delayed sample data signal including N delayed sample data signals are obtained; and
  a data regeneration step in which a delayed sample data signal is selected from the N delayed sample data signals of the parallel delayed sample data signal based on the information of the edge point operation output signal and the selected delayed sample data signal is outputted as a regenerated data signal.

18. A signal regeneration method as claimed in claim 17, wherein the extracted clock signal is outputted to the outside of the device that employs the signal regeneration method.

19. A signal regeneration method as claimed in claim 17, wherein the delay time of the delay step is set so that time necessary for obtaining the extracted clock signal based on a parallel sample data signal will not become longer than time necessary for obtaining the regenerated data signal from the parallel sample data signal.

20. A signal regeneration method as claimed in claim 17, wherein in the delay step, the N sample data signals of the parallel sample data signal are delayed keeping phase differences between the N sample data signals.

21. A signal regeneration method as claimed in claim 17, wherein the delay step is executed by a delay means which includes N flip-flop lines each of which including M stages of flip-flops (M: natural number), in which each flip-flop line is supplied with corresponding one of the N clock signals of the N-phase clock signal to clock terminals of its M flip-flops and delays corresponding one of the N sample data signals of the parallel sample data signal by M bits.

22. A signal regeneration method as claimed in claim 17, wherein the delay step is executed by a delay means which includes a 1/L frequency demultiplier for demultiplying the frequencies of the N clock signals of the N-phase clock signal by L (L: integer larger than 1) and N flip-flop lines each of which including M stages of flip-flops (M: natural number), in which each flip-flop line is supplied with corresponding one of the N clock signals of the N-phase clock signal whose frequency has been demultiplied by the 1/L frequency demultiplier to clock terminals of its M flip-flops and delays corresponding one of the N sample data signals of the parallel sample data signal by M×L bits.

23. A signal regeneration method as claimed in claim 17, wherein the edge point operation output signal generated in the edge point detection operation step includes information on the phase number of a clock signal in the N clock signals of the N-phase clock signal that indicates a rising edge of the input data signal.

24. A signal regeneration method as claimed in claim 23, wherein the edge point operation output signal generated in the edge point detection operation step includes information on the number of edge points of the input data signal in one cycle of the extracted clock signal.

25. A signal regeneration method as claimed in claim 23, wherein the edge point operation output signal generated in the edge point detection operation step includes information on the average of the phase numbers that indicate the rising edges of the input data signal in a predetermined period.

26. A signal regeneration method as claimed in claim 17, wherein the edge point operation output signal generated in the edge point detection operation step includes information on the phase number of a clock signal in the N clock signal of the N-phase clock signal that indicates a falling edge of the input data signal.

27. A signal regeneration method as claimed in claim 26, wherein the edge point operation output signal generated in the edge point detection operation step includes information on the number of edge points of the input data signal in one cycle of the extracted clock signal.

28. A signal regeneration method as claimed in claim 26, wherein the edge point operation output signal generated in the edge point detection operation step includes information on the average of the phase numbers that indicate the falling edges of the input data signal in a predetermined period.

29. A signal regeneration method as claimed in claim 28, wherein in the clock signal extraction step, the information on the average of the phase numbers that indicate the falling edges of the input data signal is utilized for the selection of the extracted clock signal.

30. A signal regeneration method as claimed in claim 17, wherein in the edge point detection operation step, the N sample data signals of the parallel sample data signal are acquired with timing in sync with the extracted clock signal.

31. A signal regeneration method as claimed in claim 25, wherein in the clock signal extraction step, the information on the average of the phase numbers that indicate the rising edges of the input data signal is utilized for the selection of the extracted clock signal.

32. A signal regeneration method as claimed in claim 17, wherein in the data regeneration step, the regenerated data signal is outputted with timing in sync with the extracted clock signal.

* * * * *